US010750136B2

United States Patent
Kaizu et al.

(10) Patent No.: US 10,750,136 B2
(45) Date of Patent: Aug. 18, 2020

(54) IMAGE PROCESSING APPARATUS, IMAGE PROCESSING METHOD, AND IMAGE PICKUP DEVICE

(71) Applicant: SONY CORPORATION, Tokyo (JP)

(72) Inventors: Shun Kaizu, Kanagawa (JP); Yasutaka Hirasawa, Tokyo (JP); Yuhi Kondo, Tokyo (JP); Teppei Kurita, Tokyo (JP); Ying Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/339,579

(22) PCT Filed: Aug. 28, 2017

(86) PCT No.: PCT/JP2017/030719
§ 371 (c)(1),
(2) Date: Apr. 4, 2019

(87) PCT Pub. No.: WO2018/074064
PCT Pub. Date: Apr. 26, 2018

(65) Prior Publication Data
US 2019/0260974 A1 Aug. 22, 2019

(30) Foreign Application Priority Data

Oct. 17, 2016 (JP) ................................. 2016-203366

(51) Int. Cl.
| | | |
|---|---|---|
| H04N 9/04 | (2006.01) | |
| H04N 5/217 | (2011.01) | |
| H04N 5/235 | (2006.01) | |
| G06T 5/50 | (2006.01) | |
| H04N 5/225 | (2006.01) | |
| H04N 5/232 | (2006.01) | |

(52) U.S. Cl.
CPC .......... *H04N 9/04515* (2018.08); *G06T 5/50* (2013.01); *H04N 5/2173* (2013.01); *H04N 5/225* (2013.01); *H04N 5/232* (2013.01); *H04N 5/2352* (2013.01)

(58) Field of Classification Search
None
See application file for complete search history.

(56) References Cited

U.S. PATENT DOCUMENTS

2009/0278954 A1* 11/2009 Kanamori ............. H04N 9/045
348/222.1
2013/0016189 A1* 1/2013 Hosaka .................. G03B 35/00
348/49

(Continued)

FOREIGN PATENT DOCUMENTS

| JP | 2000-152095 A | 5/2000 |
|---|---|---|
| JP | 2010-166580 A | 7/2010 |

(Continued)

OTHER PUBLICATIONS

Wolff et al., Constraining Object Features Using a Polarization Reflectance Model, IEEE Transactions on Pattern Analysis and Machine Intelligence, Jul. 1991, pp. 635-657, vol. 13, No. 7.

(Continued)

*Primary Examiner* — Quan Pham
(74) *Attorney, Agent, or Firm* — Paratus Law Group, PLLC

(57) ABSTRACT

An image pickup unit 20 has a configuration in which non-polarizing pixels and polarizing pixels are disposed, the polarizing pixels being provided per angle in at least two polarization directions. A demosaicing unit 50 generates a non-polarized image, and a polarization component image per polarization direction, from a captured image generated by the image pickup unit 20. A polarization information generating unit 60 generates polarization information indicating the polarization characteristics of a subject included in the captured image, from the non-polarized image and the polarization component image generated by the demosaicing unit 50. As described above, the polarization information is generated with not only the polarization component image (Continued)

but also the highly-sensitive non-polarized image not having a decrease in the amount of light. Therefore, accurate polarization information can be acquired compared to a case where polarization information is generated on the basis of the polarization component image.

12 Claims, 27 Drawing Sheets

(56) References Cited

U.S. PATENT DOCUMENTS

| | | | | |
|---|---|---|---|---|
| 2013/0182154 A1* | 7/2013 | Kimura | ............... | H04N 5/2353 348/272 |
| 2019/0174077 A1* | 6/2019 | Mitani | ................. | G06T 3/4038 |
| 2019/0385006 A1* | 12/2019 | Kashitani | ............... | H04N 5/369 |

FOREIGN PATENT DOCUMENTS

| | | |
|---|---|---|
| JP | 2014-074690 A | 4/2014 |
| JP | 2015-046698 A | 3/2015 |
| JP | 2015-128257 A | 7/2015 |
| WO | WO 2008/099589 A1 | 8/2008 |
| WO | WO 2014/119257 A1 | 8/2014 |

OTHER PUBLICATIONS

Atkinson et al., Recovery of Surface Orientation From Diffuse Polarization, IEEE Transactions on Image Processing, Jun. 2006, pp. 1653-1664, vol. 15, No. 6.

* cited by examiner

FIG. 10
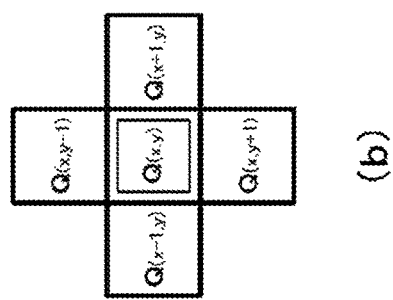
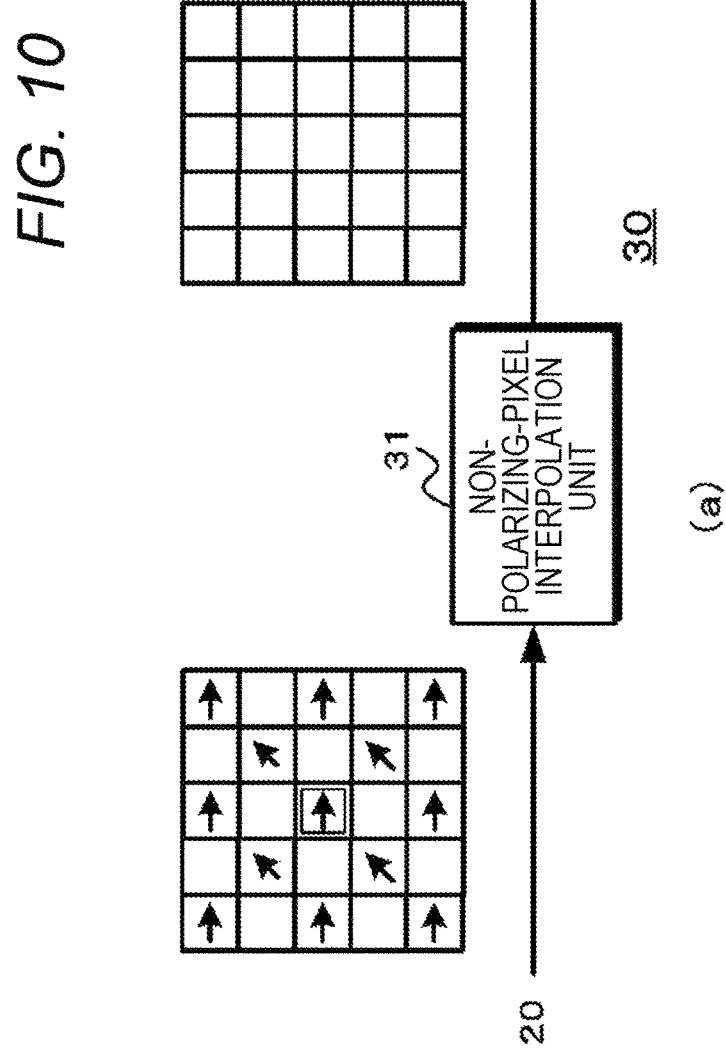

FIG. 13
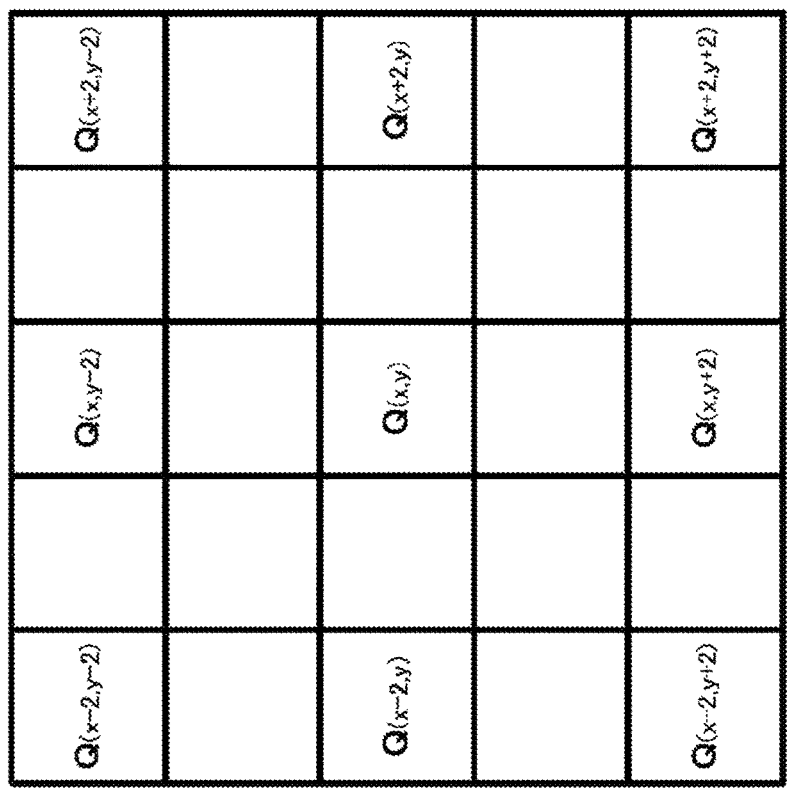
(b)
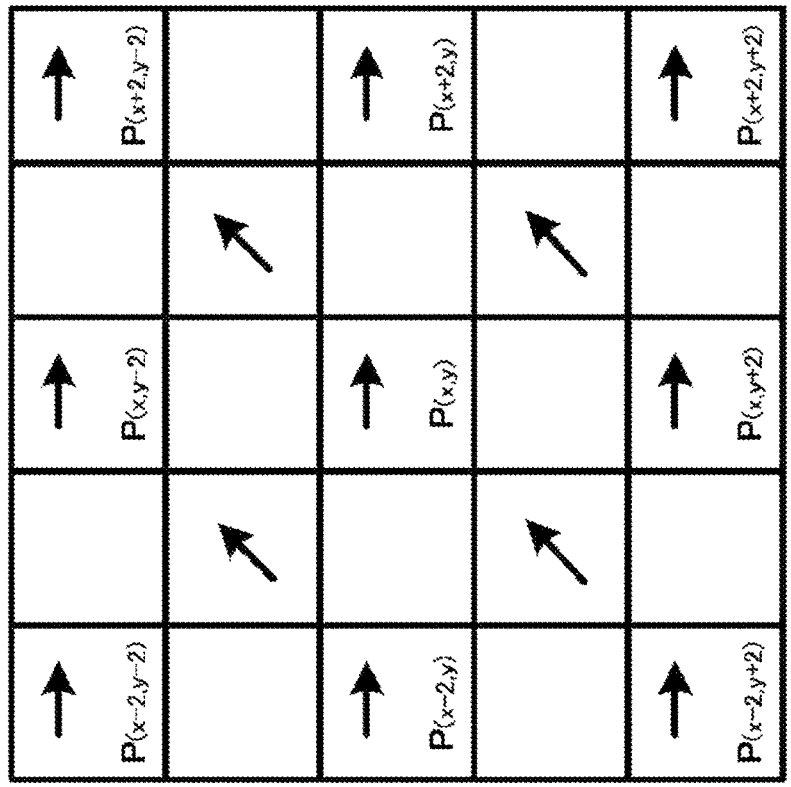
(a)

FIG. 14
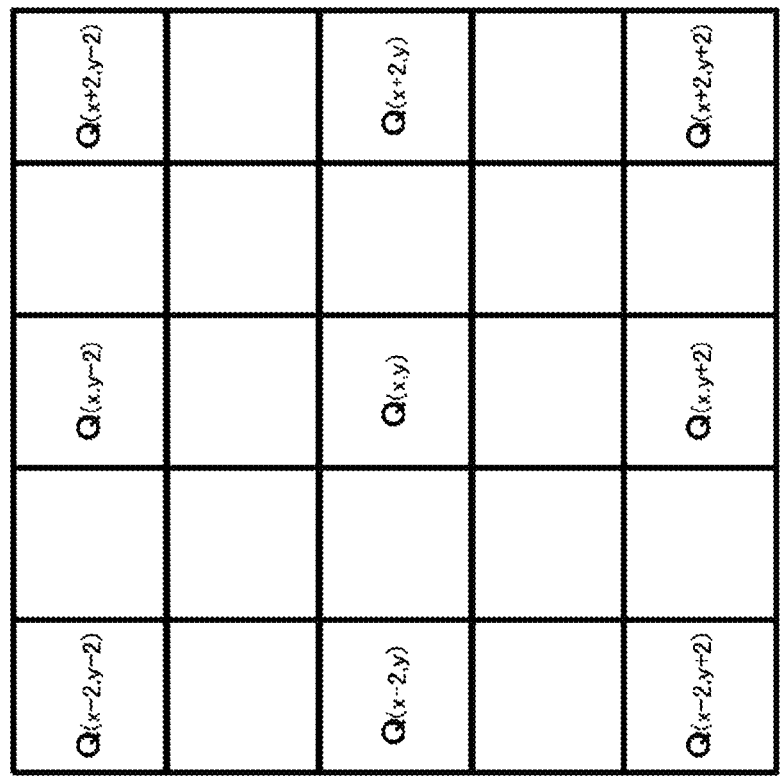
(b)
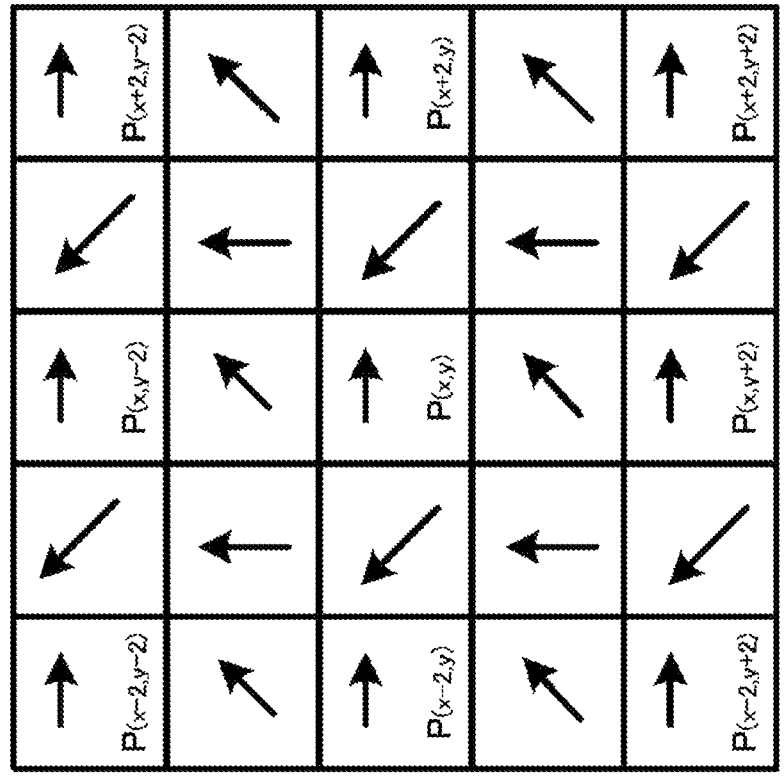
(a)

FIG. 17
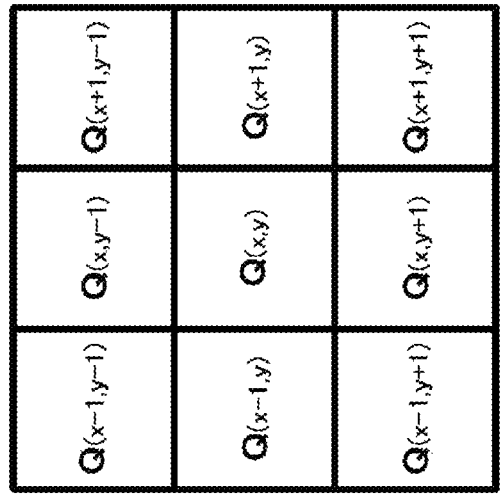
(b)
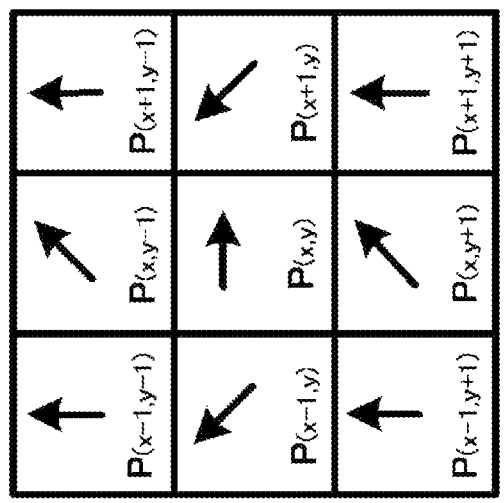
(a)

IMAGE PROCESSING APPARATUS, IMAGE PROCESSING METHOD, AND IMAGE PICKUP DEVICE

CROSS REFERENCE TO PRIOR APPLICATION

This application is a National Stage Patent Application of PCT International Patent Application No. PCT/JP2017/030719 (filed on Aug. 28, 2017) under 35 U.S.C. § 371, which claims priority to Japanese Patent Application No. 2016-203366 (filed on Oct. 17, 2016), which are all hereby incorporated by reference in their entirety.

TECHNICAL FIELD

This technology relates to an image processing apparatus, an image processing method, and an image pickup device so as to accurately acquire polarization information.

BACKGROUND ART

Conventionally, there has been disclosed a method of acquiring a polarized image with an image pickup unit and a polarizing filter. For example, Patent Document 1 discloses a method of acquiring polarized images in a plurality of polarization directions, in the method a polarizing filter is disposed in front of an image pickup unit and shooting is performed by turning the polarizing filter. Furthermore, there has been disclosed a method of acquiring, with a polarizing filter giving any direction of a plurality of polarization directions to pixels, a polarized image in which a polarization component per polarization direction is expressed in units of pixels, by image capturing at a time.

Furthermore, there is obtained normal information regarding a subject, from a polarized image in which a polarization component per polarization direction is expressed in units of pixels. For example, in Non-Patent Documents 1 and 2, normal information is calculated with substitution of a polarization component for each of a plurality of polarization directions into a model expression.

CITATION LIST

Patent Document

Patent Document 1: International Publication No. 2008/099589

Non-Patent Document

Non-Patent Document 1: Lawrence B. Wolff and Terrance E. Boult: "Constraining Object Features Using a Polarization Reflectance Model", IEEE Transaction on pattern analysis and machine intelligence, Vol. 13, No. 7, July 1991
Non-Patent Document 2: Gary A. Atkinson and Edwin R. Hancock: "Recovery of surface orientation from diffuse polarization", IEEE Transactions of Image Processing, Vol. 15, Issue. 6, pp. 1653-1664, 2006

SUMMARY OF THE INVENTION

Problems to be Solved by the Invention

Meanwhile, when non-polarized light passes through a polarizing filter, only horizontal light is acquired by blocking, light oscillating in a specific polarization direction, light oscillating vertically for example; however, the amount of light decreases due to the blockage of the vertically oscillating light. As a result, increase in noise in the polarized image due to the decrease in the amount of light prevents accurately acquiring the polarization information from the polarized image.

Therefore, this technology provides an image processing apparatus, an image processing method, and an image pickup device capable of accurately acquiring polarization information.

Solutions to Problems

According to a first aspect of this technology, an image processing apparatus including: a demosaicing unit configured to generate a non-polarized image, and a polarization component image per polarization direction, from an captured image including non-polarizing pixels and polarizing pixels per at least two polarization directions; and a polarization information generating unit configured to generate polarization information indicating a polarization characteristic of a subject included in the captured image, from the non-polarized image and the polarization component image generated by the demosaicing unit.

In this technology, the demosaicing unit generates the non-polarized image and the polarization component image per polarization direction, from the captured image including the non-polarizing pixels and the polarizing pixels per at least two polarization directions. In the generation of the polarization component image, for example, with a target pixel, a polarizing pixel at a pixel position where the polarizing pixel is identical in polarization direction to the target pixel, in peripheral pixels of the target pixel, and non-polarizing pixels equal in a pixel position to the polarizing pixel and at a pixel position of the target pixel, and with a relationship between a pixel average value of non-polarizing pixels at pixel positions in the identical polarization direction and a pixel value of the non-polarizing pixel at the pixel position of the target pixel for each of the polarization directions, the pixel value of the polarizing pixel at the pixel position of the target pixel relative to a pixel average value of polarizing pixels at pixel positions in the identical polarization direction is calculated to generate the polarization component image per polarization direction.

Furthermore, there are provided a pixel processing unit configured to generate, with a non-polarizing pixel, a pixel at a pixel position of a polarizing pixel, and generate a non-polarized image; and a noise removal unit that calculates a weight to be used for smoothing filter processing, on the basis of a non-polarizing pixel at a pixel position of a target pixel and a non-polarizing pixel at a pixel position of a peripheral pixel identical in polarization direction to the target pixel, the noise removal unit calculating, with the calculated weight, the target pixel, and a polarizing pixel at the pixel position of the peripheral pixel identical in polarization direction to the target pixel, a pixel value of a polarizing pixel at the pixel position of the target pixel, the noise removal unit performing noise removal on the polarizing pixel at the pixel position of the target pixel, and the demosaicing unit generates the polarization component image, with the polarizing pixel after noise removal by the noise removal unit.

The polarization information generating unit, for example, calculates a polarization parameter of a polarization model expression indicating the polarization characteristic at a target pixel position, on the basis of the polarization directions, a non-polarizing pixel at the target pixel position, and a polarizing pixel for each of the polarization directions, and generates polarization information indicating the polarization characteristic of the subject included in the captured image. Furthermore, the polarization information generating unit uses a pixel value of the non-polarizing pixel equal in sensitivity to the polarizing pixel, as the polarization parameter.

Moreover, there is provided a normal information generating unit that generates normal information regarding the subject on the basis of the polarization information generated by the polarization information generating unit.

According to a second aspect of this technology, an image processing method including: generating, by a demosaicing unit, a non-polarized image and a polarization component image per polarization direction, from an captured image including non-polarizing pixels and polarizing pixels per at least two polarization directions; and generating, by a polarization information generating unit, polarization information indicating a polarization characteristic of a subject included in the captured image, from the non-polarized image and the polarization component image generated by the demosaicing unit.

According to a third aspect of this technology, an image pickup device in which non-polarizing pixels and polarizing pixels are disposed, the polarizing pixels being provided per at least two polarization directions.

In this technology, the non-polarizing pixels and the polarizing pixels are disposed, the polarizing pixels being provided per polarization direction such that at least two polarization directions are symmetrical in angle with respect to sides of the pixels each having a rectangular shape. Furthermore, the non-polarizing pixels and the polarizing pixels are disposed such that in a 2×2 pixel region, the non-polarizing pixels each are provided at a diagonal pixel position and the remaining pixels are the polarizing pixels, for example. Moreover, the polarizing pixels per polarization directions are identical in color, and the non-polarizing pixels are pixels per predetermined color component.

Furthermore, there is provided a pixel control unit that controls to make the non-polarizing pixels identical in sensitivity to the polarizing pixels, for example, the pixel control unit controlling an exposure period of time of the non-polarizing pixels or the polarizing pixels to make the non-polarizing pixels identical in sensitivity to the polarizing pixels. Furthermore, a pixel processing unit is provided, and, for example, the pixel processing unit performs interpolation processing with non-polarizing pixels, or unification processing on neighboring polarizing pixels identical in polarization direction and unification processing on neighboring non-polarizing pixels, the pixel processing unit generating a non-polarized image, or a non-polarized image and a polarized image. Furthermore, the pixel processing unit performs unification processing on pixels identical in color.

Effects of the Invention

According to this technology, the non-polarized image and the polarization component image per polarization direction are generated by the demosaicing unit, from the captured image including the non-polarizing pixels and the polarizing pixels per at least two polarization directions, and the polarization information indicating the polarization characteristic of the subject included in the captured image is generated from the non-polarized image and the polarization component image. As described above, the polarization information is generated with not only the polarization component image but also the highly-sensitive non-polarized image not having a decrease in the amount of light. Therefore, accurate polarization information can be acquired compared to a case where polarization information is generated on the basis of the polarization component image. Note that the effects described in this specification are merely exemplified and are not intended to be limiting and may have additional effects.

BRIEF DESCRIPTION OF DRAWINGS

FIG. 10 is a view for describing a first embodiment of an image processing unit.

FIG. 13 is a view for describing the operation of the noise removal unit.

FIG. 14 is a view for describing the other operation of the noise removal unit.

FIG. 17 is a view for describing the operation of the second embodiment of the demosaicing unit.

MODE FOR CARRYING OUT THE INVENTION

Figure 1:
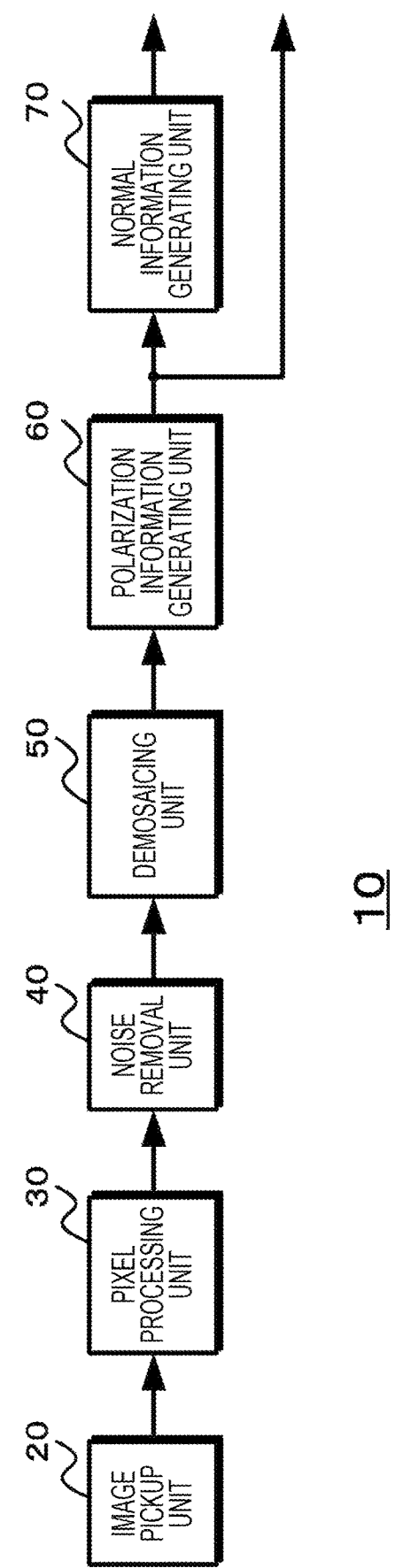
FIG. 1 is a diagram illustrating the configuration of an embodiment of an image processing apparatus.

Hereinafter, a mode for carrying out the present technology will be described. Note that the description will be given in the following order.
1. Configuration and Operation of Embodiment of Image Processing Apparatus
1-1. About Image Pickup Unit
1-1-1. First Embodiment of Image Pickup Unit
1-1-2. Second Embodiment of Image Pickup Unit
1-1-3. Third Embodiment of Image Pickup Unit
1-2. About Pixel Processing Unit
1-2-1. First Embodiment of Pixel Processing Unit
1-2-2. Second Embodiment of Pixel Processing Unit
1-3. About Noise Removal Unit
1-4. About Demosaicing Unit
1-4-1. First Embodiment of Demosaicing Unit
1-4-2. Second Embodiment of Demosaicing Unit
1-5. Polarization Information Generating Unit
1-5-1. First Operation of Polarization Information Generating Unit
1-5-2. Second Operation of Polarization Information Generating Unit
1-6. Normal Information Generating Unit
2. Other Embodiment
3. Application Example 1. Configuration and Operation of Embodiment of Image Processing Apparatus FIG. 1 exemplifies the configuration of an embodiment of an image processing apparatus. An image processing apparatus 10 includes an image pickup unit 20, a demosaicing unit 50, a polarization information generating unit 60, and a normal information generating unit 70. Furthermore, the image processing apparatus 10 may be provided with a pixel processing unit 30 in accordance with the configuration of the image pickup unit 20, or may be provided with a noise removal unit 40 in order to reduce adverse influences due to noise. Note that the image pickup unit 20, the normal information generating unit 70, and the like may be separated from the image processing apparatus 10.

<1-1. Image Pickup Unit>

The image pickup unit 20 includes non-polarizing pixels and polarizing pixels disposed, the polarizing pixels being provided per at least two polarization directions, and generates an image signal of a captured image to output the image signal to the pixel processing unit 30, the noise removal unit 40, or the demosaicing unit 50.

<1-1-1. First Embodiment of Image Pickup Unit>

Figure 2:
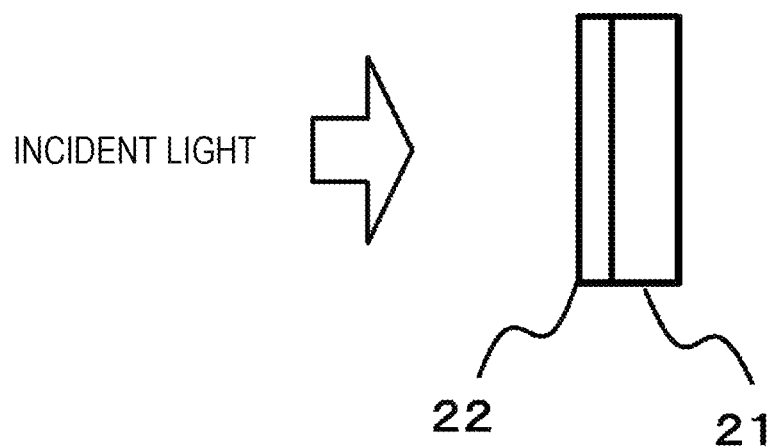
FIG. 2 is a view exemplifying the configuration of a first embodiment of an image pickup unit.

According to a first embodiment of the image pickup unit, the image pickup unit generates an image signal of a captured image from non-polarizing pixels, and pixels per at least two polarization components. FIG. 2 exemplifies the configuration of the image pickup unit according to the first embodiment. An image pickup unit 20-1 includes a polarizing filter 22-1 disposed on the incidence face of an image sensor 21-1.

Figure 3:
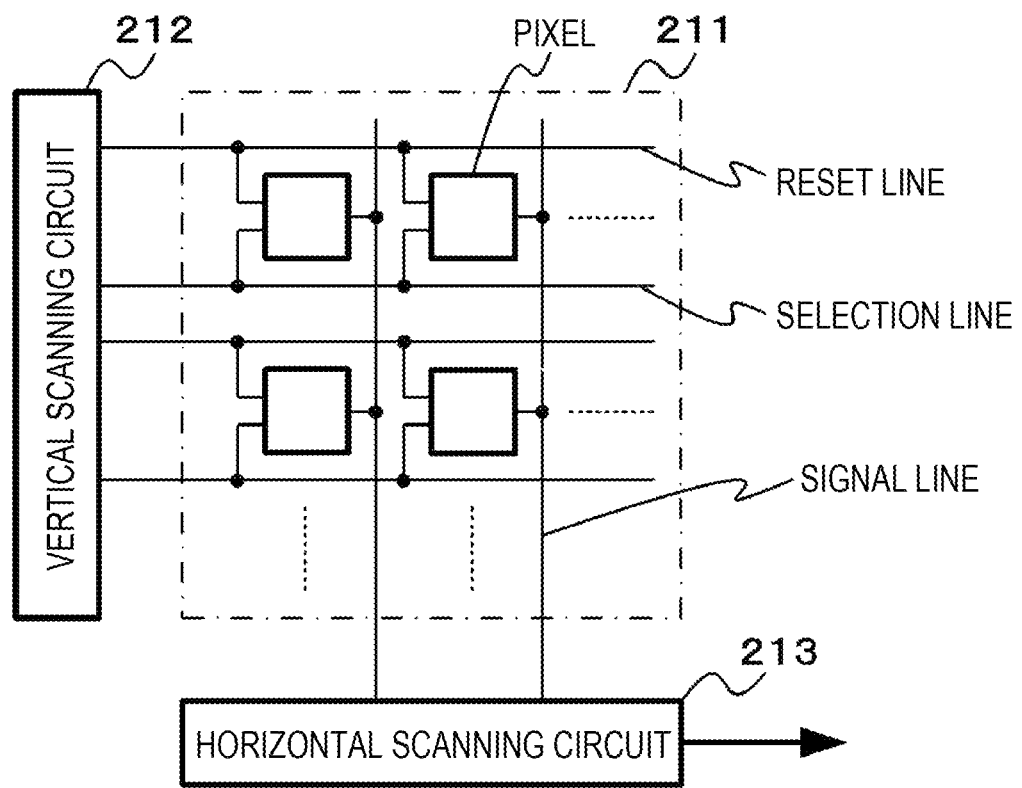
FIG. 3 is a view exemplifying the configuration of an image sensor in the first embodiment of the image pickup unit.

FIG. 3 exemplifies the configuration of the image sensor in the first embodiment of the image pickup unit. The image sensor 21-1 includes: a pixel array unit 211 in which a plurality of pixels is arranged in an array, for example, in a two-dimensional matrix; a vertical scanning circuit 212; and a horizontal scanning circuit 213, the vertical scanning circuit 212 and the horizontal scanning circuit 213 being, for example, to control the driving of the pixel array unit 211. Note that, in order to simplify the description, only some pixels in a row direction and a column direction are indicated in the pixel array unit 211.

Although not illustrated, the pixels of the pixel array unit 211 each have a photodiode, a charge-transfer transistor, and a reset transistor. Each pixel is connected to the vertical scanning circuit 212 through a reset line and a selection line, and is connected to the horizontal scanning circuit 213 through a signal line.

The vertical scanning circuit 212 outputs a reset signal to the reset transistor of the pixel through the reset line and causes the reset transistor to discharge stored charge. Thereafter, the vertical scanning circuit 212 outputs a read signal to the respective charge-transfer transistors of the polarizing pixel and the non-polarizing pixel through the selection line, and causes the signal line to output, as a signal current, charge stored during the exposure period of time from the output of the reset signal to the output of the read signal. The horizontal scanning circuit 213 performs processing of converting the signal current read from each pixel into a digital pixel signal, gain adjustment processing on the pixel signal, and the like, and outputs the processed pixel signal to the pixel processing unit 30, the noise removal unit 40, or the demosaicing unit 50 in order of the pixels in a vertical direction. Furthermore, the vertical scanning circuit 212 and the horizontal scanning circuit 213 perform the above-described processing on each line.

Figure 4:
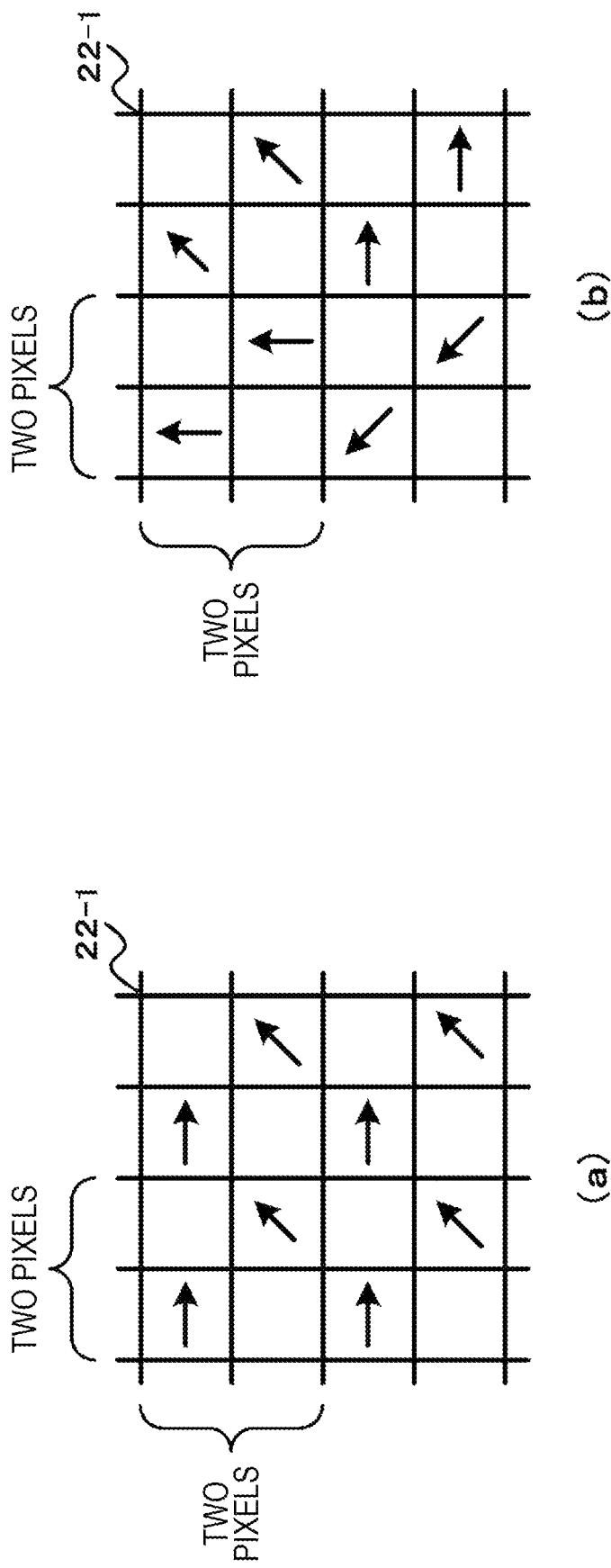
FIG. 4 is a view exemplifying the configuration of a polarizing filter in the first embodiment of the image pickup unit.

FIG. 4 exemplifies the configuration of the polarizing filter in the first embodiment of the image pickup unit. The polarizing filter 22-1 includes non-polarizing pixels, and polarizing pixels provided with at least two of a plurality of polarization directions. Use of photonic liquid crystal, wire grids, or the like provides the polarizing pixels with at least two polarization directions. In (a) of FIG. 4, there is illustrated a case of two polarization directions, for example, the polarization angle α for two polarization directions satisfies "α0=0° and α1=45°". In (b) of FIG. 4, there is illustrated a case of four polarization directions, for example, the polarization angle α for four polarization directions satisfies "α0=0°, α1=45°, α2=90°, and α3=135°". Furthermore, as illustrated in FIG. 4, the polarizing filter 22-1 has a configuration such that each 2×2 pixel region includes non-polarizing pixels positioned at two pixel positions (for example, diagonal positions) and the remaining pixels being polarizing pixels.

The image pickup unit configured as described above, sequentially reads the pixel signal, and generates an image signal of the captured image including the polarizing pixels and the non-polarizing pixels to output the resulting signal to the demosaicing unit 50, or the demosaicing unit 50 through the pixel processing unit 30 or the noise removal unit 40.

<1-1-2. Second Embodiment of Image Pickup Unit>

Next, a second embodiment of the image pickup unit will be described. According to the second embodiment of the image pickup unit, an image sensor differs from the image sensor according to the first embodiment, and a pixel control unit performs control of making polarizing pixels identical in sensitivity to non-polarizing pixels and generates an image signal of a captured image.

Figure 5:
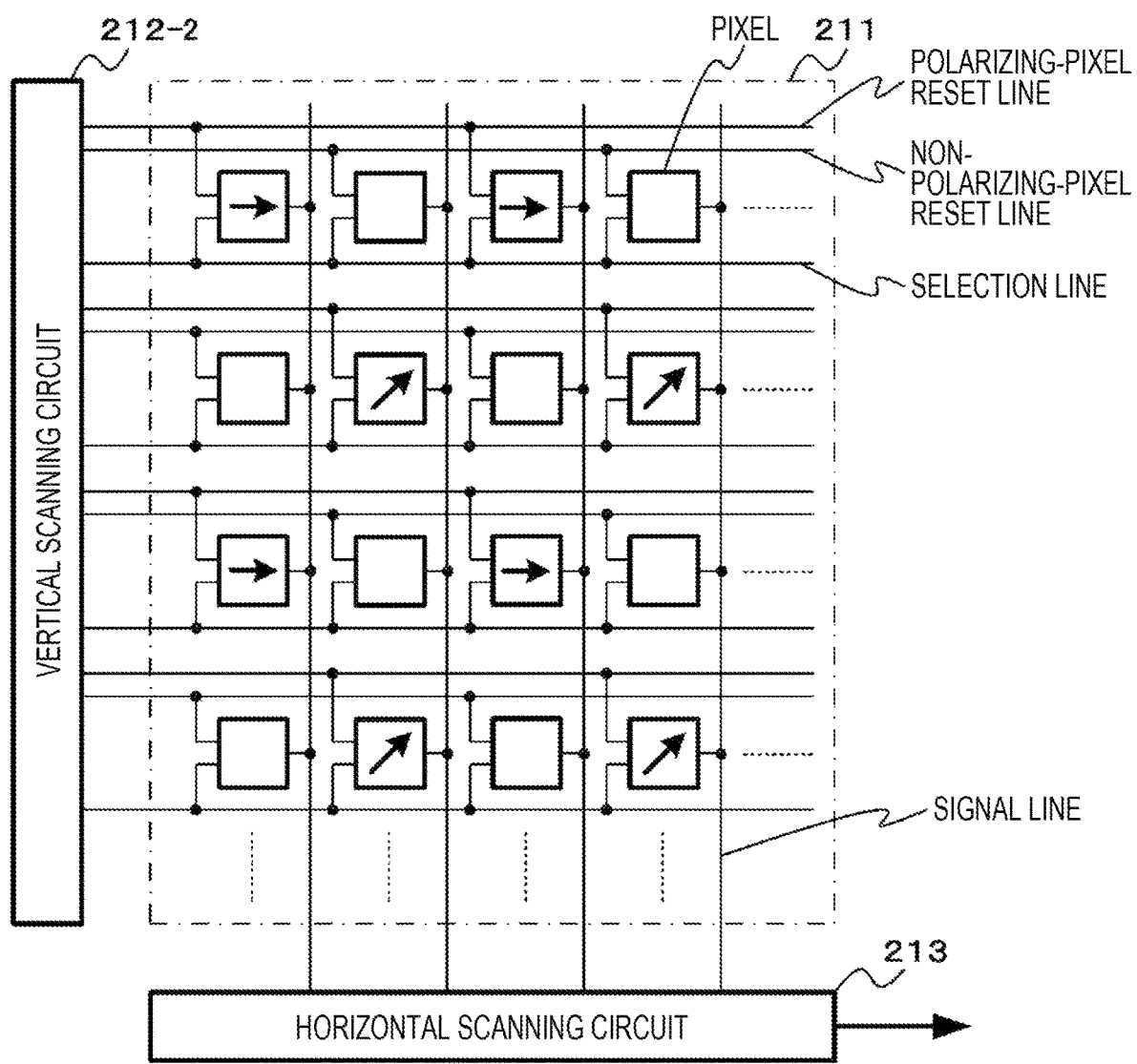
FIG. 5 is a view exemplifying the configuration of an image sensor in a second embodiment of the image pickup unit.

FIG. 5 exemplifies the configuration of the image sensor according to the second embodiment of the image pickup unit. An image sensor 21-2 includes: a pixel array unit 211 in which a plurality of pixels is arranged in a two-dimensional matrix; a vertical scanning circuit 212-2; and a horizontal scanning circuit 213. The image sensor 21-2 controls the exposure period of time of the polarizing pixels and the non-polarizing pixels to make the polarizing pixels identical in sensitivity to the non-polarizing pixels. Note that, in order to simplify the description, only some pixels in a row direction and a column direction are indicated in the pixel array unit 211.

Although not illustrated, the pixels of the pixel array unit 211 each have a photodiode, a charge-transfer transistor, and a reset transistor. Each of the polarizing pixels is connected to the vertical scanning circuit 212-2 through a polarizing-pixel reset line and a selection line, and is connected to the horizontal scanning circuit 213 through a signal line. Furthermore, each of the non-polarizing pixels is connected to the vertical scanning circuit 212-2 through a non-polarizing-pixel reset line and the selection line, and is connected to the horizontal scanning circuit 213 through the signal line. Note that, in FIG. 5, the polarization direction in the polarizing pixel is indicated by an arrow.

The vertical scanning circuit 212-2 outputs a reset signal to a reset transistor of the polarizing pixel through the polarizing-pixel reset line and causes the reset transistor to discharge stored charge. Furthermore, the vertical scanning circuit 212-2 outputs a reset signal to a reset transistor of the non-polarizing pixel through the non-polarizing-pixel reset line and causes the reset transistor to discharge stored charge. Thereafter, the vertical scanning circuit 212 outputs a read signal to the respective charge-transfer transistors of the polarizing pixel and the non-polarizing pixel through the selection line, and causes the signal line to output, as a signal current, charge stored during the exposure period of time from the output of the reset signal to the output of the read signal. The horizontal scanning circuit 213 performs processing of converting the signal current read from each pixel into a digital pixel signal, gain adjustment processing on the pixel signal, and the like, and outputs the processed pixel signal to the demosaicing unit 50 in order of the pixels in a vertical direction. Furthermore, the vertical scanning circuit 212 and the horizontal scanning circuit 213 perform the above-described processing on each line. Moreover, the vertical scanning circuit 212 controls the exposure period of time of the polarizing pixels or the non-polarizing pixels to make the polarizing pixels identical in sensitivity to the non-polarizing pixels. For example, the vertical scanning circuit 212 operates as the pixel control unit, controls the timing of the reset signals of the non-polarizing pixels, and controls the exposure period of time of the non-polarizing pixels such that the non-polarizing pixels are equal in sensitivity to the polarizing pixels, resulting in making the polarizing pixels identical in sensitivity to the non-polarizing pixels.

Figure 6:
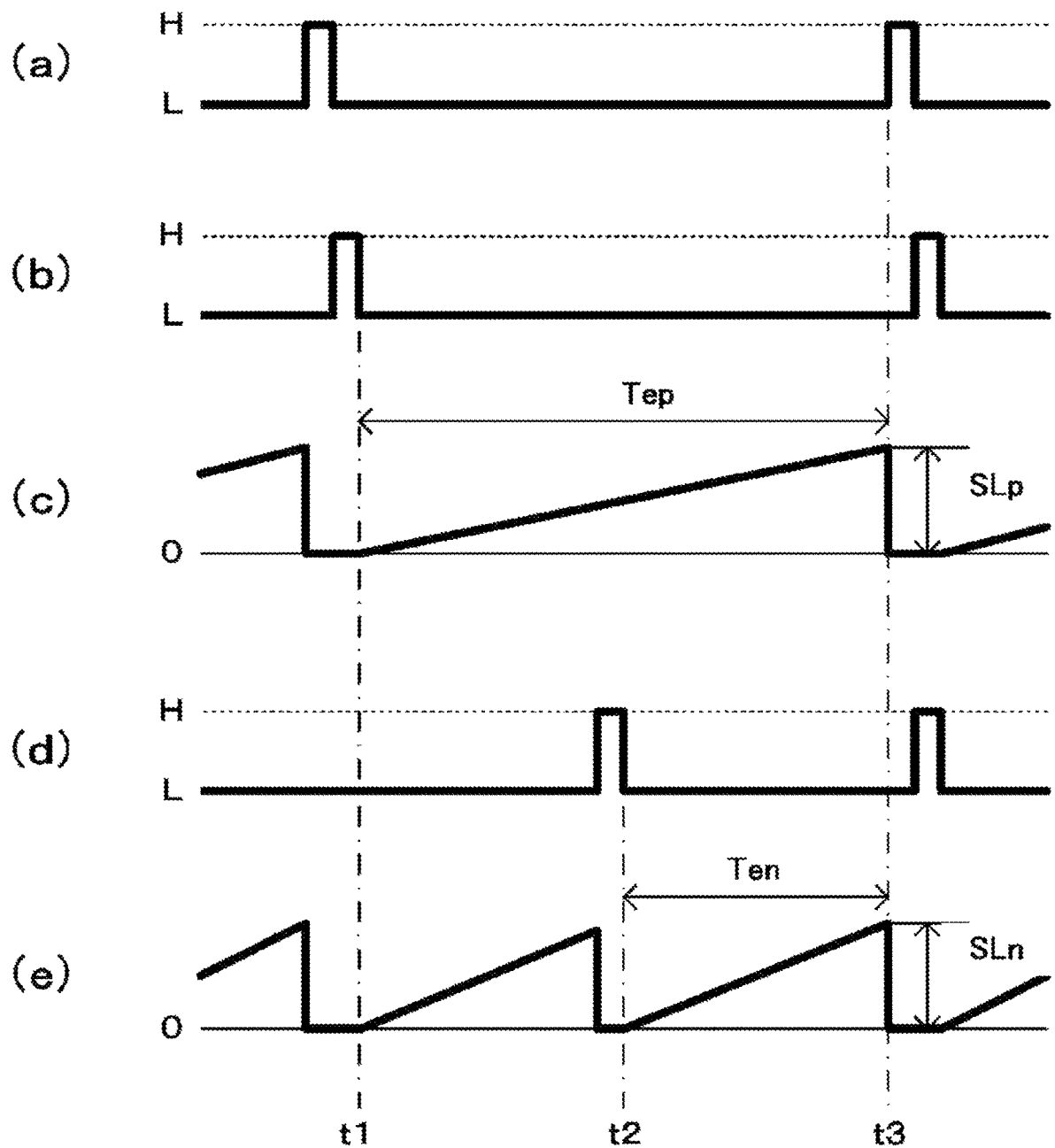
FIG. 6 is a timing chart for describing the operation of the image sensor in the second embodiment of the image pickup unit.

FIG. 6 is a timing chart for describing the operation of the image sensor in the second embodiment of the image pickup unit. An image pickup unit 20-2 independently controls the output of the polarizing-pixel reset signal and the output of the non-polarizing-pixel reset signal, thereby adjusting the exposure period of time of the non-polarizing pixels such that the polarizing pixels and the non-polarizing pixels are equal in signal level, in a case where, for example, a non-polarized subject is captured.

(a) of FIG. 6 indicates a read signal SCa for reading a signal corresponding to stored charge from the polarizing pixels and the non-polarizing pixels. (b) of FIG. 6 indicates a reset signal SCbp for the polarizing pixels, and (c) of FIG. 6 indicates the amount of stored charge in the polarizing pixels. After the stored charge is discharged from the polarizing pixels in response to the reset signal SCbp, charge is stored in the polarizing pixels in accordance with incident light from a time point t1 when the reset signal SCbp ends.

(d) of FIG. 6 indicates a reset signal SCbn for the non-polarizing pixels, and (e) of FIG. 6 indicates the amount of stored charge in the non-polarizing pixels. After the stored charge is discharged from the non-polarizing pixels in response to the reset signal SCbn, charge is stored in the non-polarizing pixels in accordance with incident light from a time point t2 when the reset signal SCbn ends.

In the polarizing pixels and the non-polarizing pixels, the read signal SCa reads the stored charge at a time point time t3. In other words, for the polarizing pixels, the period of time from the time point t1 to t3 corresponds to an exposure time Tep, and for the non-polarizing pixels, the period of time from time point t2 to t3 corresponds to an exposure time Ten. Therefore, shortening of the exposure time Ten to the exposure time Tep in accordance with the sensitivity of the non-polarizing pixels to the polarizing pixels enables generation of an image signal in which a signal level SLp of the polarizing pixels is equal to a signal level SLn of the non-polarizing pixels, even when the polarizing pixels and the non-polarizing pixels are different in sensitivity.

Note that the image pickup unit may perform the operation of the pixel control unit at the horizontal scanning circuit 213 and may adjust the gain of the pixel signal such that the polarizing pixels are identical in sensitivity to the non-polarizing pixels.

According to the second embodiment of such an image pickup unit, the image pickup unit 20-2 can generate an image signal of a captured image in which there is no difference in sensitivity between the polarizing pixel pixels and the non-polarizing pixels.

<1-1-3. Third Embodiment of Image Pickup Unit>

Next, a third embodiment of the image pickup unit will be described. In a case where polarizing pixels are provided in a plurality of polarization directions as indicated in the first embodiment of the image pickup unit, there is a possibility that variation in sensitivity occurs due to, for example, difficulty in forming a polarizer at a fine pixel. As a result, in occurrence of variation in sensitivity in the image pickup unit, even when, for example, a non-polarized subject having uniform luminance is captured, variation occurs in signal level between the pixel signals generated in the polarizing pixels. Therefore, according to the third embodiment of the image pickup unit, use of a polarizing filter having a configuration different from those of the respective polarizing filters of the first and second embodiments reduces variation in sensitivity due to difference in polarization direction.

Figure 7:
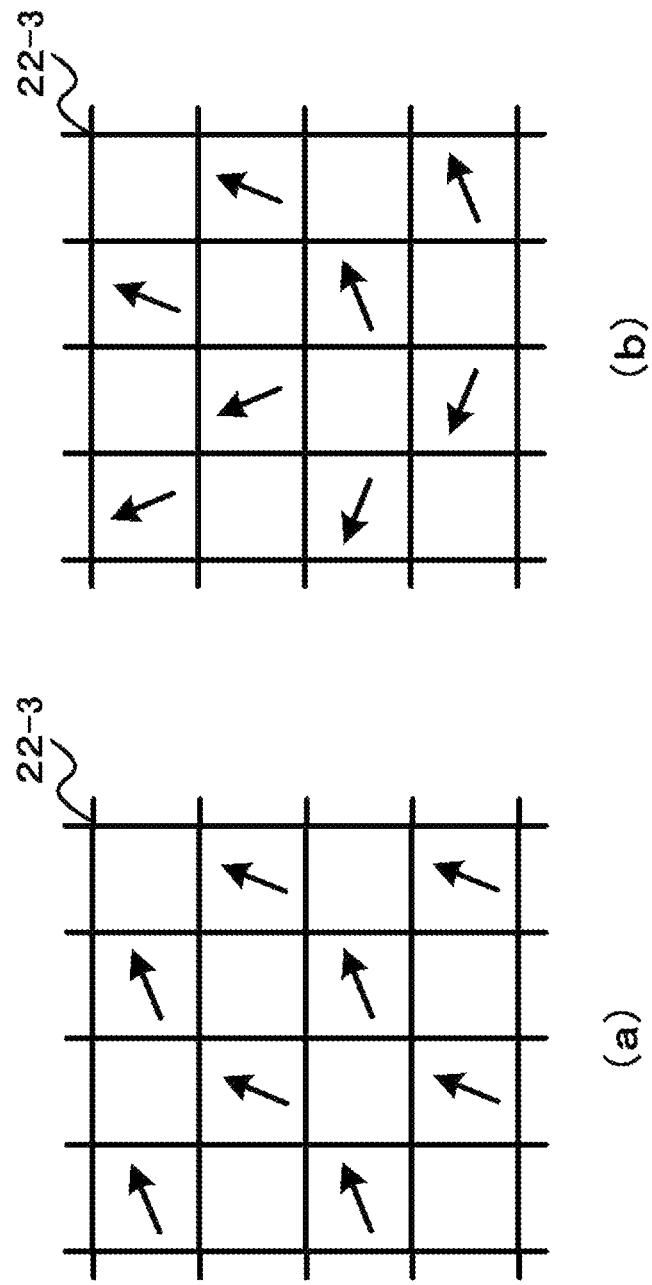
FIG. 7 is a view exemplifying the configuration of a polarizing filter in a third embodiment of the image pickup unit.

A polarizing filter 22-3 used in the third embodiment of the image pickup unit has a configuration such that the polarization directions are symmetrical in angle with respect to sides of the rectangular pixels of an image sensor. FIG. 7 exemplifies the configuration of the polarizing filter in the third embodiment of the image pickup unit. For example, the polarization direction of the polarizing filter illustrated in (a) of FIG. 7 has "α0=22.5° and α1=67.5°". Furthermore, the polarization direction of the polarizing filter illustrated in (a) of FIG. 7 has "α0=22.5°, α1=67.5°, α2=112.5°, and α3=157.5°".

Figure 8:
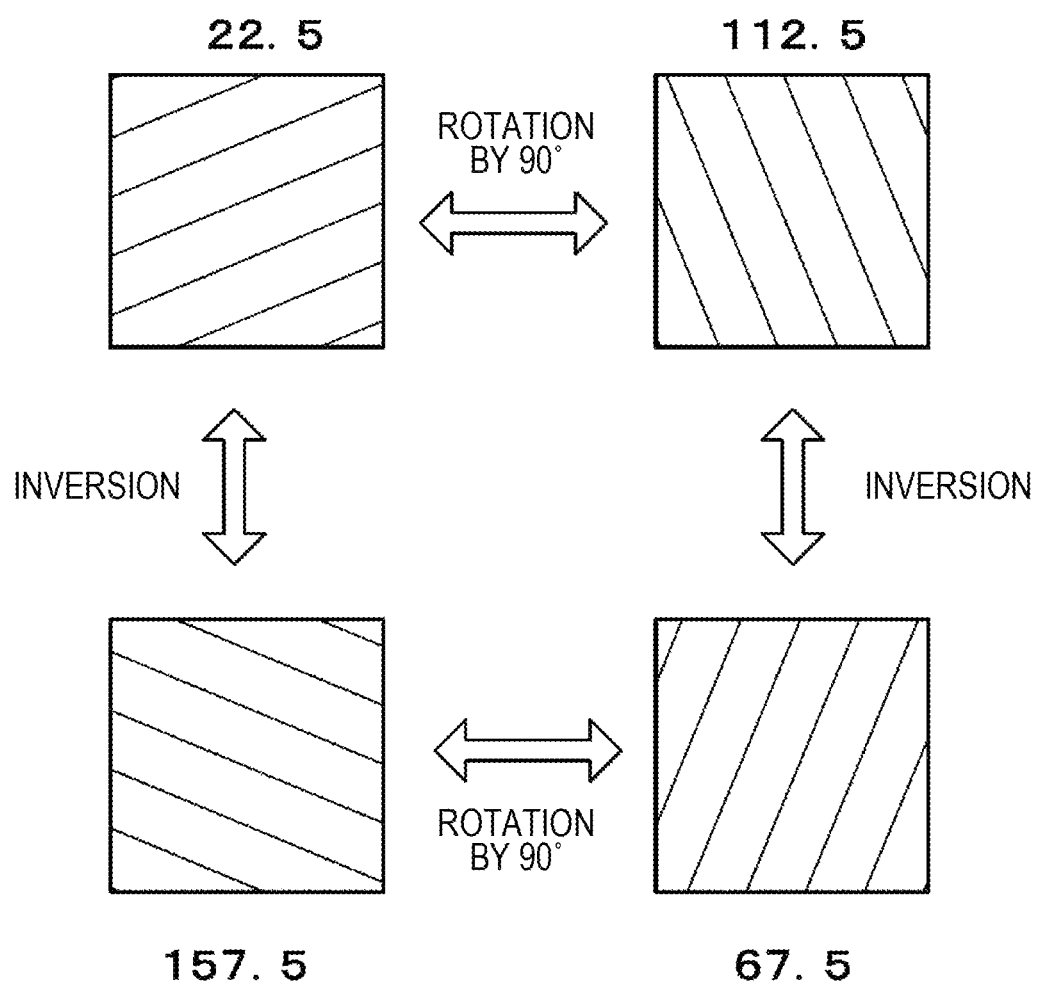
FIG. 8 is a view for describing the positional relationship between a polarization direction and a rectangular pixel.

FIG. 8 is a view for describing the positional relationship between the polarization direction and the rectangular pixel. As illustrated in FIG. 8, when the polarizing pixel having "α0=22.5°" is inverted in the vertical direction or the horizontal direction, the polarization direction has "α3=157.5°". Furthermore, when a reference side switches, in other words, the polarizing pixel with "α0=22.5°" rotates by 90°, the polarization direction has "α2=112.5°", and when the polarizing pixel is further inverted in the vertical direction or the horizontal direction, the polarization direction has "α1=67.5°". As described above, when the polarizing filter 22-3 has the polarization directions symmetrical in angle with respect to the sides of the rectangular pixels of the image sensor, for example, difficulty in forming the polarizing filter at a fine pixel is constant regardless of the polarization directions. Thus, variation in sensitivity between the polarizing pixels due to difference in polarization direction can be more reduced than the case of using the polarizing filter illustrated in FIG. 4 having the polarization directions asymmetrical in angle, for example. Furthermore, when the polarization direction has "α0=22.5°, α1=67.5°, α2=112.5°, and α3=157.5°", difference in angle between the polarization directions can be equalized (45°). Note that, the polarization direction is not limited to the above angles, and even when, for example, the polarization direction has "10°, 80, 100°, and 170°", the polarization directions are symmetrical in angle with respect to the sides of the rectangular pixels of the image sensor. In this case, difference in angle between the polarization directions is inconstant (20° or 70°). Furthermore, the polarization directions may have a range including an allowable error EA for the above-described angles, for example, "22.5°±EA, 67.5°±EA, . . . ".

Figure 9:
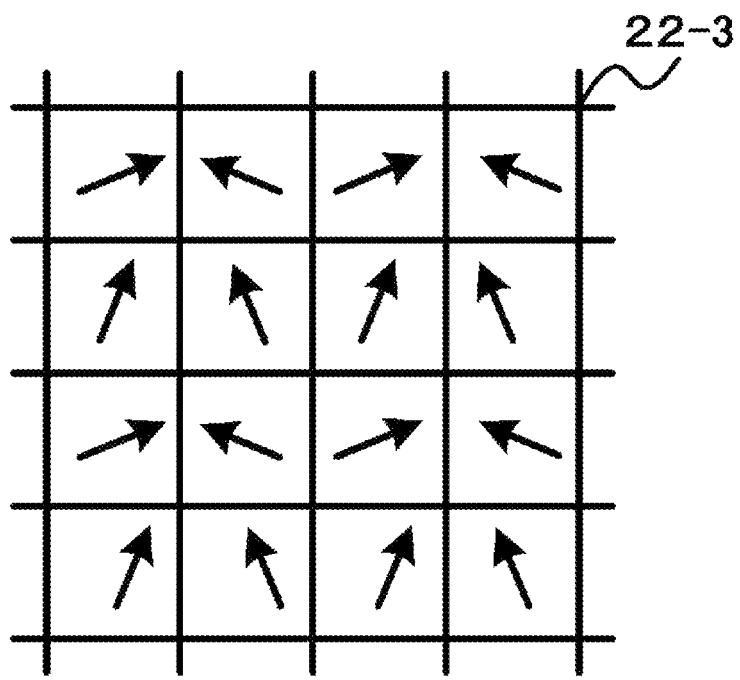
FIG. 9 is a view illustrating an example of a case in which polarizing pixels in a plurality of polarization directions is disposed adjacent to each other.

Moreover, in a case where the polarizing pixels in a plurality of polarization directions are disposed adjacent to each other, crosstalk occurs between adjacent pixels. Thus, the pixels having a large difference in angle between the adjacent pixels are disposed spaced apart from each other. For example, as illustrated in FIG. 9, the polarizing pixels having a difference of 90° in angle are disposed diagonally in position.

According to the third embodiment of such an image pickup unit, the positional relationship between the polarization directions to the pixels of the image sensor is equal in the plurality of polarization directions. Thus, for example, difficulty in forming the polarizing filter at a fine pixel is constant in the polarization directions, whereby variation in sensitivity due to difference in polarization direction can be reduced.

<1-2. About Pixel Processing Unit>

On the basis of an image signal of a captured image generated by the image pickup unit 20, the pixel processing unit 30 generates an image signal of a non-polarized image including non-polarizing pixels, or an image signal of a polarized image including polarizing pixels in a plurality of polarization directions and an image signal of a non-polarized image, and outputs the resulting signal to the noise removal unit 40 or the demosaicing unit 50.

Furthermore, for the pixel processing unit 30, as illustrated in (a) of FIG. 4, in a case where each 2×2 pixel region includes non-polarizing pixels positioned at two pixel positions and the remaining pixels being polarizing pixels different in polarization direction, in the pixel disposition in the image pickup unit 20, and the noise removal unit 40 performs noise removal, the pixel processing unit 30 performs processing in a first mode. Furthermore, as illustrated in (b) of FIG. 4, in a case where each 2×2 pixel region includes non-polarizing pixels positioned at two pixel positions and the remaining pixels being polarizing pixels identical in polarization direction, in the pixel disposition in the image pickup unit 20, the pixel processing unit 30 performs processing in a second mode.

<1-2-1. First Embodiment of Pixel Processing Unit>

In a first embodiment of the image processing unit, a case where a non-polarized image is generated will be described. FIG. 10 is a view for describing the first embodiment of the image processing unit.

As illustrated in (a) of FIG. 10, the pixel processing unit 30 includes a non-polarizing-pixel interpolation unit 31. The non-polarizing-pixel interpolation unit 31 calculates a pixel value at a pixel position of a polarizing pixel for which a pixel value of a non-polarizing pixel is not obtained, by interpolation processing with the pixel values of peripheral non-polarizing pixels. For example, as illustrated in (b) of FIG. 10, when the non-polarizing pixel value Q(x, y) at the position (x, y) indicated by a double frame is calculated, Expression (1) with the pixel values of the non-polarizing Q(x, y−1), Q(x−1, y), Q(x+1, y), and Q(x+1, y+1) peripherally positioned is computed to calculate the pixel value Q(x, y).

$$Q(x,y)=(Q(x,y-1)+Q(x-1,y)+Q(x+1,y)+Q(x+1,y+1))/4 \qquad (1)$$

The pixel processing unit 30 performs interpolation processing with the peripheral non-polarizing pixels per pixel position of the polarizing pixels, and as illustrated in (a) of FIG. 10, generates a non-polarized image from the captured image generated by the image pickup unit 20, in other words, the captured image including polarizing pixels and non-polarizing pixels.

<1-2-2. Second Embodiment of Pixel Processing Unit>

Figure 11:
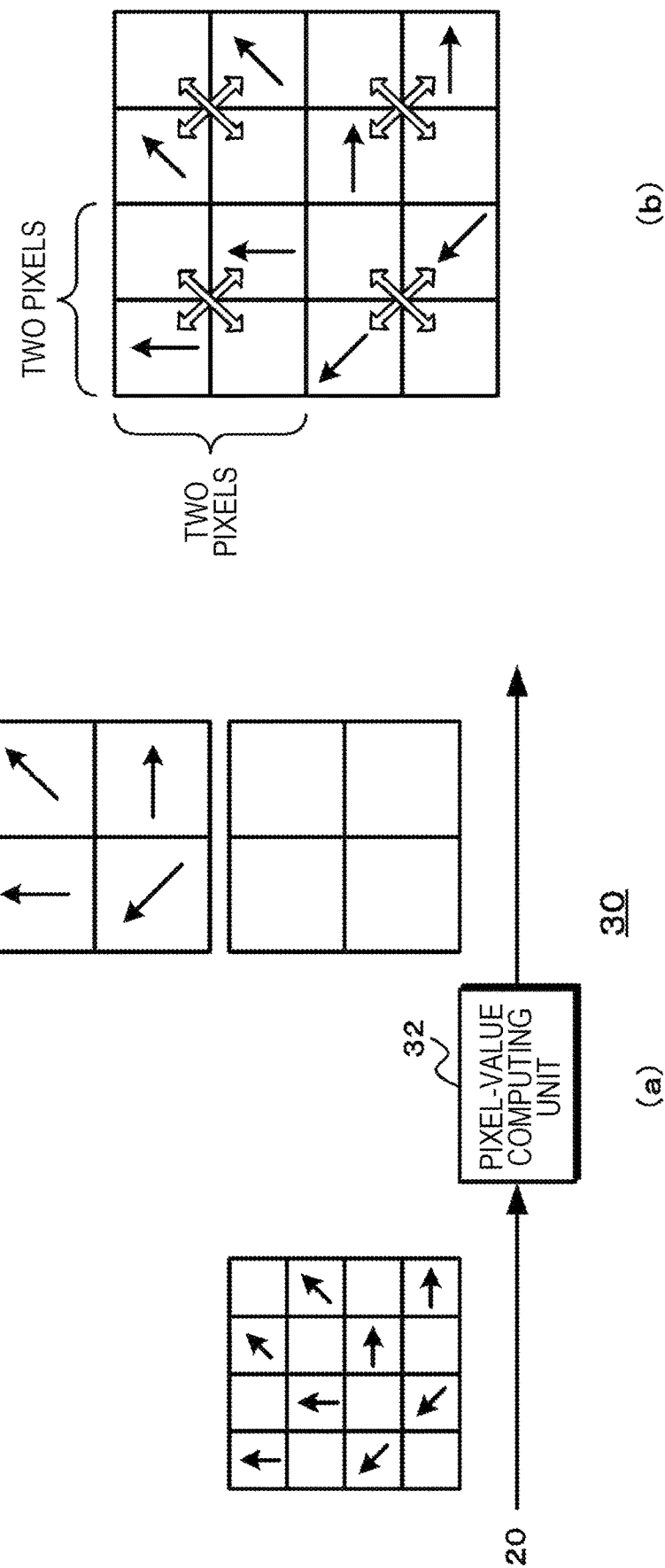
FIG. 11 is a view for describing a second embodiment of the image processing unit.

In a second embodiment of the pixel processing unit 30, there will be described a case where unification processing on neighboring polarizing pixels identical in polarization direction and unification processing on neighboring non-polarizing pixels are performed to generate a non-polarized image and a polarized image. FIG. 11 is a view for describing the second embodiment of the image processing unit.

As illustrated in (a) of FIG. 11, a pixel processing unit 30 includes a pixel-value computing unit 32. The pixel-value computing unit 32 sets unit regions such that each unit region includes pixels identical in polarization direction and non-polarizing pixels, and performs pixel addition or pixel averaging for each of the polarizing pixels identical in polarization direction and the non-polarizing pixels in the unit region. In a case where, for example, the pixel disposition of the image pickup unit 20 has the configuration illustrated in (b) of FIG. 4, the pixel-value computing unit 32 sets each 2×2 pixel region as a unit region including pixels identical in polarization direction and non-polarizing pixels as illustrated in (b) of FIG. 11. Furthermore, as indicated by a white arrow, the pixel-value computing unit 32 determines a pixel addition value or a pixel average value of two pixels identical in polarization direction included in the unit region as a pixel value of the polarized image, and determines a pixel addition value or a pixel average value of two non-polarizing pixels included in the unit region as a pixel value of the non-polarized image. Note that the polarized image including polarizing pixels in a plurality of polarization directions and the non-polarized image generated by the pixel-value computing unit 32 have a resolution of ½ because the 2×2 pixel region is set as the unit region.

<1-3. About Noise Removal Unit>

The noise removal unit 40 performs noise removal with a non-polarized image on the captured image generated by the image pickup unit 20 or the polarized image generated by the pixel processing unit 30. The noise removal unit 40 calculates a weight to be used for smoothing filter processing, on the basis of a non-polarizing pixel at the pixel position of a target pixel that is a pixel on which noise is to be removed and non-polarizing pixels at the pixel positions of the peripheral pixels identical in polarization direction to the target pixel, and then uses the calculated weight, the target pixel, and the polarizing pixels at the position of the peripheral pixels identical in polarization direction to the target pixel to calculate a pixel value of a polarizing pixel at the pixel position of the target pixel. The noise removal unit 40 increases a weight as a portion closer the target pixel on which noise is to be removed and performs smoothing filter processing, thereby performing noise removal on the polarizing pixel of the captured image or the polarized image. Hereinafter, in an embodiment of the noise removal unit, a case where a joint bilateral filter is used as a smoothing filter will be described.

Figure 12:
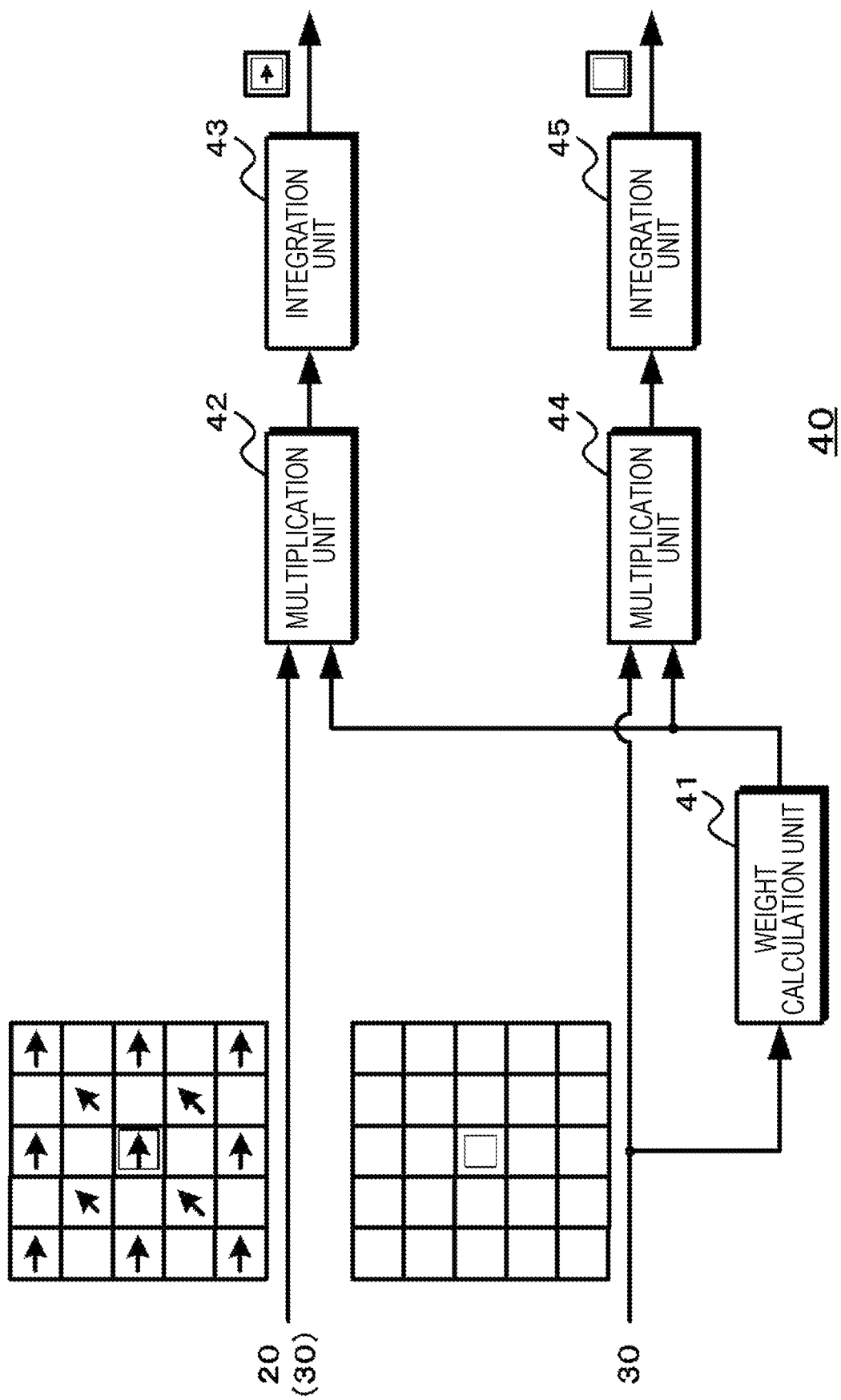
FIG. 12 is a view exemplifying the configuration of an embodiment of a noise removal unit.

FIG. 12 exemplifies the configuration of the embodiment of the noise removal unit. The noise removal unit 40 includes a weight calculation unit 41, multiplication units 42 and 44, and integration units 43 and 45. The weight calculation unit 41 uses the target pixel and the peripheral pixels positioned in the periphery of the target pixel from the non-polarized image, uses the luminance difference between the target pixel and the peripheral pixels and the distance between the pixels, and calculates the respective weights of the target pixel and the peripheral pixels to output the weights to the multiplication units 42 and 44.

The multiplication unit 42 uses the polarized image and the weights calculated by the weight calculation unit 41, and multiplies the pixel values of the target pixel and the peripheral pixels by the weights to output the multiplied results to the integration unit 43. The multiplication unit 44 uses the non-polarized image and the weights calculated by the weight calculation unit 41, and multiplies the pixel values of the target pixel and the peripheral pixels by the weights to output the multiplied results to the integration unit 45.

The integration unit 43 integrates the multiplied results of the multiplication unit 42 and determines the result as a pixel value of the polarized image after noise removal of the target pixel (pixel indicated by a double frame). The integration unit 45 integrates the multiplied results of the multiplication unit 44 and determines the result as a pixel value of the non-polarized image after noise removal of the target pixel (pixel indicated by double frame).

The noise removal unit 40 determines each pixel of the non-polarizing pixels as a target pixel, sequentially calculates weights as described above, multiplies the target pixel and the peripheral pixels by the weights, and integrates the multiplied results, thereby removing the noise from the polarized image and the non-polarized image to output the polarized image after noise removal to the demosaicing unit 50.

FIG. 13 is a view for describing the operation of the noise removal unit; (a) of FIG. 13 illustrates the captured image generated by the image pickup unit 20; and (b) of FIG. 13 illustrates the non-polarized image generated by the non-polarizing-pixel interpolation unit 31 of the pixel processing unit 30.

The weight calculation unit 41 of the noise removal unit 40 determines the position of a peripheral pixel equal in polarization direction to the polarizing pixel at the target pixel position "x, y" as a peripheral pixel position. Therefore, each of the pixel positions "x−2, y−2", "x, y−2", "x+2, y−2", "x−2, y", "x+2, y", "x−2, y+2", "x, y+2", and "x+2, y+2" illustrated in the figure is the peripheral pixel position.

Here, in the polarized image, the pixel value of the target pixel has "P(x, y)", and the pixel values at the peripheral pixel positions have "P(x−2, y−2)", "P(x, y−2)", "P(x+2, y−2)", "P(x−2, y)", "P(x+2, y)", "P(x−2, y+2)", "P(x, y+2)", and "P(x+2, y+2)". Furthermore, in the non-polarized image, the pixel value of the target pixel has "Q(x, y)", and the pixel values at the peripheral pixel positions have "Q(x−2, y−2)", "Q(x, y−2)", "Q(x+2, y−2)", "Q(x−2, y)", "Q(x+2, y)", "Q(x−2, y+2)", "Q(x, y+2)", or "Q(x+2, y+²)".

The weight calculation unit 41 calculates, on the basis of Expression (2), the weight S(i, j) according to a distance from the target pixel. Furthermore, the weight calculation unit 41 calculates, on the basis of Expression (3), the weight T(i, j) according to the luminance difference between the target pixel and the peripheral pixels. Note that as in Expression (2) and at in Expression (3) are standard deviations. Furthermore, in the case of FIG. 13, "i=−2, 0, 2 and j=−2, 0, 2".

[Mathematical Formula 1]

$$S_{(x,y)} = \exp\left(\frac{i^2 + j^2}{2\sigma_s^2}\right) \quad (2)$$

$$T_{(i,j)} = \exp\left(\frac{(Q_{(x+i,y+j)} - Q_{(x,y)})^2}{2\sigma_t^2}\right) \quad (3)$$

The multiplication unit 42 uses the polarized image and the weights calculated by the weight calculation unit 41 and multiplies the pixel values of the target pixel and the peripheral pixels by the weights. The integration unit 43 integrates the multiplied results of the multiplication unit 42 and determines the resulting value as the pixel value of the polarized image after noise removal of the target pixel. In other words, the multiplication unit 42 and the integration unit 43 compute Expression (4) to calculate the polarizing pixel value Pnr(x, y) after noise removal of the target pixel. Note that, in the case of FIG. 13, the peripheral pixels equal in polarization direction are alternately positioned every other pixel, so that weights and the pixel values are used every other pixel as indicated in Expression (4).

[Mathematical Formula 2]

$$Pnr_{(x,y)} = \frac{\Sigma_j \Sigma_i P_{(x+i,y+j)} \cdot S_{(i,j)} \cdot T_{(i,j)}}{\Sigma_j \Sigma_i S_{(i,j)} \cdot T_{(i,j)}} \quad (4)$$

The multiplication unit 44 uses the non-polarized image and the weights calculated by the weight calculation unit 41, and multiplies the pixel values of the target pixel and the peripheral pixels by the weights. The integration unit 45 integrates the multiplied results of the multiplication unit 44 and determines the resulting value as the pixel value of the non-polarized image after noise removal of the target pixel. Furthermore, for the noise removal on the non-polarizing pixels, the weights are calculated with not only the peripheral pixel positions equal in polarization direction but also the non-polarizing pixels at the peripheral pixel positions different in polarization direction, and the noise removal is performed. In other words, the multiplication unit 44 and the integration unit 45 compute Expression (5) to calculate the non-polarizing pixel value Qnr(x, y) after noise removal of the target pixel.

[Mathematical Formula 3]

$$Qnr_{(x,y)} = \frac{\Sigma_j \Sigma_i Q_{(x+i,y+j)} \cdot S_{(i,j)} \cdot T_{(i,j)}}{\Sigma_j \Sigma_i S_{(i,j)} \cdot T_{(i,j)}} \quad (5)$$

Furthermore, in the pixel processing unit 30, in a case where the polarized image including the polarizing pixels in the plurality of polarization directions and the non-polarized image are generated by the pixel-value computing unit 32, noise can be removed from each of the polarized image and the non-polarized image by processing similarly. FIG. 14 is a view for describing another operation of the noise removal unit; (a) of FIG. 14 exemplifies the polarized image generated by the pixel-value computing unit 32; and (b) of FIG. 14 exemplifies the non-polarized image generated by the pixel-value computing unit 32. Note that in the pixel-value computing unit 32, the 2×2 pixel region is set as the unit region, so that two pixels in FIG. 13 correspond to one pixel in FIG. 14. In FIG. 14, the pixels identical in polarization direction are positioned every other pixel, so that weights are calculated similarly in the above-described case, the calculated weights and the pixel values of the peripheral pixels identical in polarization direction are used, and the pixel value of the target pixel after noise removal can be calculated.

As described above, the noise removal unit 40 removes noise from the polarized image, or the polarized image and the non-polarized image, and outputs the image after noise removal to the demosaicing unit 50. Furthermore, the noise removal unit 40 uses the highly-sensitive non-polarized image to calculate the weights to be used for the smoothing filter processing, thereby enabling highly accurate noise removal of the polarizing pixel. Note that the smoothing filter is not limited to the joint bilateral filter, and the weights may be calculated from the non-polarized image, by using another smoothing filter, for example, a Gaussian filter or the like.

<1-4. About Demosaicing Unit>

The demosaicing unit performs demosaicing according to the pixel disposition of the polarizing pixels and the non-polarizing pixels in the image pickup unit to generate a polarization component image per polarization direction, or a polarization component image and a non-polarized image.

<1-4-1. First Embodiment of Demosaicing Unit>

In a first embodiment of the demosaicing unit, there will be described a case where the pixel disposition of the polarizing pixels and the non-polarizing pixels corresponds to a Bayer arrangement will be described.

Figure 15:
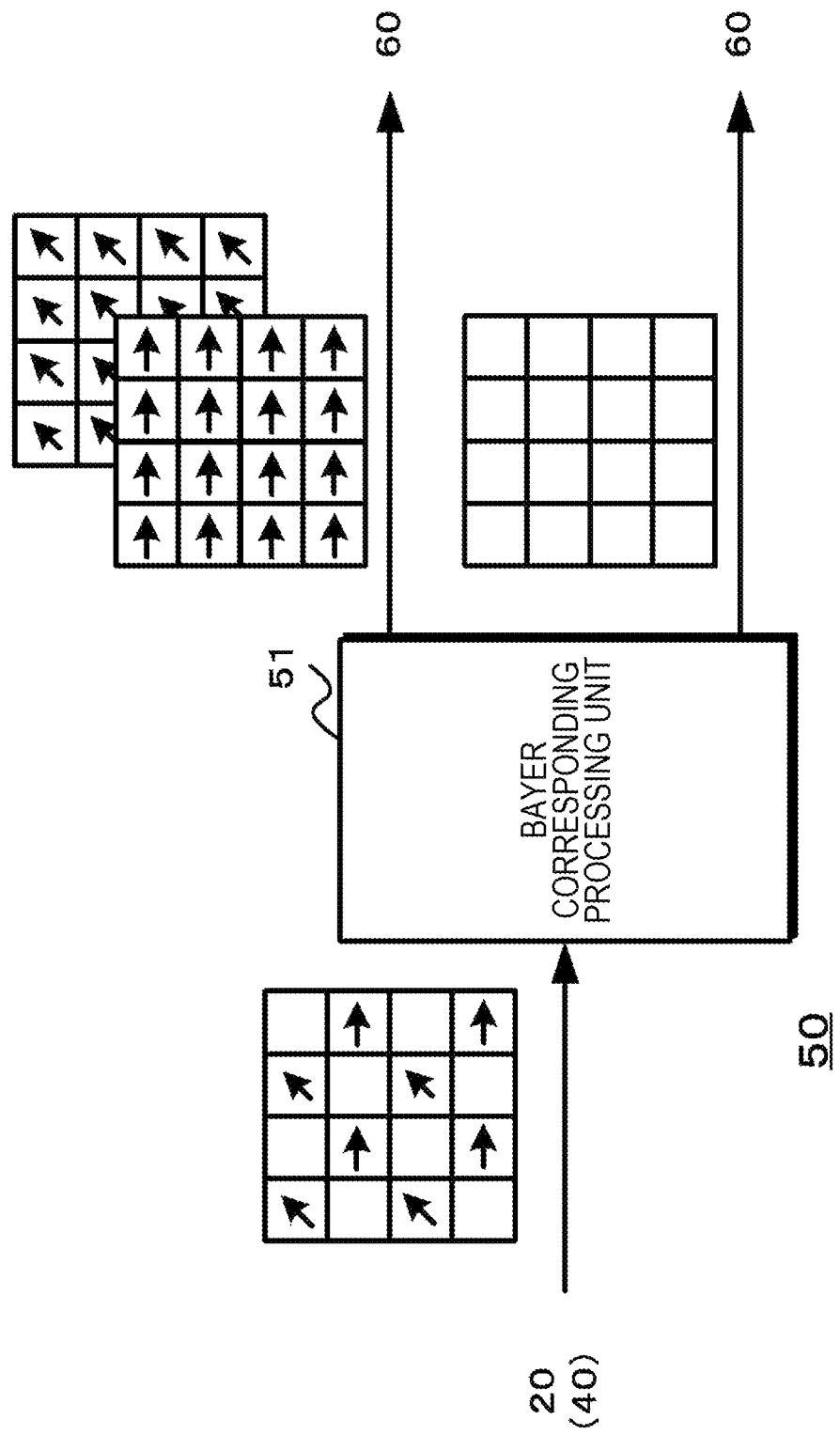
FIG. 15 is a view exemplifying a first embodiment of a demosaicing unit.

FIG. 15 exemplifies a first embodiment of the demosaicing unit. The demosaicing unit includes a Bayer corresponding processing unit 51. For example, as illustrated in (a) of FIG. 4, in a case where each 2×2 pixel region includes non-polarizing pixels positioned at two diagonal positions and the remaining pixels being polarizing pixels different in polarization direction, in the pixel disposition in the image pickup unit 20, the pixel arrangement corresponds to a Bayer arrangement. In other words, each non-polarizing pixel corresponds to a green pixel in the Bayer arrangement, the polarizing pixel in the polarization direction satisfying "α0=0°" corresponds to a red pixel (or blue pixel) in the Bayer arrangement, and the polarizing pixel in the polarization direction satisfying "α1=45°" corresponds to a blue pixel (or red pixel) in the Bayer arrangement. Therefore, the Bayer corresponding processing unit 51 performs processing of generating an image signal per color from the red pixel, the blue pixel, and the green pixel in the Bayer arrangement, similar to, for example, processing disclosed in "B. Gunturk, J. Glotzbach, Y. Altunbasak, R. schafer, and R. Mersereau, "Demosaicing: Color filter array interpolation," in IEEE Signal Processing Magazine, vol. 22, no. 1, January 2005. The Bayer corresponding processing unit 51 performs such processing and generates each image signal of the polarization component image per polarization direction and the non-polarized image, on the basis of the image signal supplied from the image pickup unit 20, or the image signal supplied from the image pickup unit 20 through the pixel processing unit 30 or the noise removal unit 40. Note that as the non-polarized image, the non-polarized image generated by the pixel processing unit 30 may be used.

<1-4-2. Second Embodiment of Demosaicing Unit>

In a second embodiment of the demosaicing unit, a case where the disposition of polarizing pixels and non-polarizing pixels are different from a Bayer arrangement will be described. A demosaicing unit uses an image signal supplied from a pixel processing unit 30, or an image signal supplied from the pixel processing unit 30 through the noise removal unit 40 to perform demosaicing. Furthermore, according to the second embodiment of the demosaicing unit, a target pixel, the polarizing pixels at the pixel positions where the polarizing pixels are identical in polarization direction to the target pixel, in the peripheral pixels of the target pixel, and the non-polarizing pixels equal in pixel position to the polarizing pixels and at the pixel position of the target pixel are used to calculate the pixel value of the polarizing pixel at the pixel position of the target pixel per polarization direction.

In a case where the pixel intervals of the non-polarizing pixels having higher sensitivity than the polarizing pixels are the pixel intervals identical in polarization direction or less, a non-polarized image generated from the non-polarizing pixels has higher resolution than a polarization component image generated from the pixels identical in polarization direction. Therefore, the demosaicing unit assumes that there is a positive correlation between the non-polarizing pixels and the polarizing pixels, and interpolate a high-frequency component lost in the polarization component image from the non-polarized image, thereby obtaining a high-resolution polarization component image. For example, the demosaicing unit calculates, with the relationship between the pixel average value of the non-polarizing pixels at the pixel positions in the identical polarization direction and the pixel value of the non-polarized pixel at the pixel position of the target pixel, the pixel value of the polarizing pixel at the pixel position of the target pixel relative to the pixel average value of the polarizing pixels at the pixel positions in the identical polarization direction. Note that, in the second embodiment of the demosaicing unit, a case where the polarization direction has four directions will be described.

Figure 16:
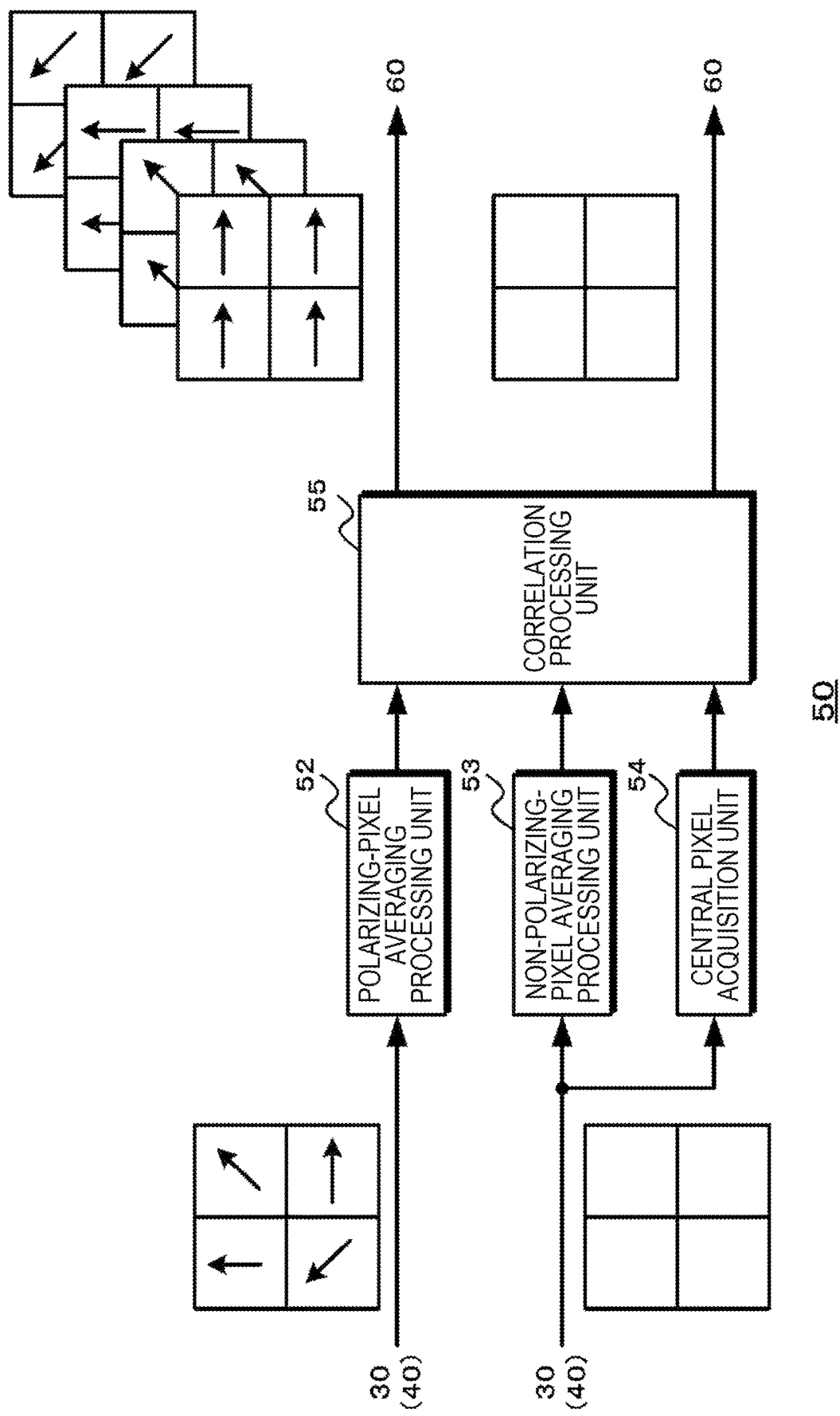
FIG. 16 is a view exemplifying a second embodiment of the demosaicing unit.

FIG. 16 exemplifies the second embodiment of the demosaicing unit. The demosaicing unit includes a polarizing-pixel averaging processing unit 52, a non-polarizing-pixel averaging processing unit 53, a central pixel acquisition unit 54, and a correlation processing unit 55.

The polarizing-pixel averaging processing unit 52 uses the target pixel and the peripheral pixels positioned in the periphery of the target pixel, calculates the pixel average value relative to the target pixel per polarization direction, and then outputs the resulting value to the correlation processing unit 55.

The non-polarizing-pixel averaging processing unit 53 uses the target pixel and the peripheral pixels positioned in the periphery of the target pixel, calculates a pixel average value from the pixels in the pixel positions equal to the case of calculating the pixel average value per polarization direction by the polarizing-pixel averaging processing unit 52, and then outputs the resulting value to the correlation processing unit 55.

The central pixel acquisition unit 54 extracts an image value of the target pixel from the non-polarized image to output the extracted image value to the correlation processing unit 55.

The correlation processing unit 55 calculates the pixel value per polarization direction of the target pixel, from the pixel average value per polarization direction calculated by the polarizing-pixel averaging processing unit 52, the pixel average value calculated by the non-polarizing-pixel averaging processing unit 53 respective to the pixel average value per polarization direction, and the pixel value of the target pixel extracted by the central pixel acquisition unit 54.

The operation of the second embodiment of the demosaicing unit will be described with reference to FIG. 17. (a) of FIG. 17 illustrates a polarized image, and (b) of FIG. 17 illustrates a non-polarized image. The polarizing-pixel averaging processing unit 52 of the demosaicing unit uses the target pixel position "x, y" and the pixels at the peripheral pixel positions "x−1, y−1", "x, y−1", "x+1, y−1", "x−1, y", "x+1, y", "x−1, y+1", "x, y+1", and "x+1, y+1", in the polarized image, and calculates a pixel average value per polarization direction. Here, in the polarized image, the pixel value at the target pixel position has "P(x, y)", and the pixel values at the peripheral pixel positions have "P(x−1, y−1)", "P(x, y−1)", "P(x+1, y−1)", "P(x−1, y)", "P(x+1, y)", "P(x−1, y+1)", "P(x, y+1)", and "P(x+1, y+1)". Furthermore, in the non-polarized image, the pixel value at the target pixel position has "Q(x, y)", and the pixel values at the peripheral pixel positions have "Q(x−1, y−1)" "Q(x, y−1)" "Q(x+1, y−1)" "Q(x−1, y)" "Q(x+1, y)", "Q(x−1, y+1)" "Q(x, y+1)", and "Q(x+1, y+1)".

The polarizing-pixel averaging processing unit 52 calculates, for example, on the basis of Expression (6), the pixel average value mP0(x, y) in the polarization direction with "α0=0°" at the target pixel position "x, y". Similarly, the polarizing-pixel averaging processing unit 52 calculates, on the basis of Expression (7), the pixel average value mP1(x, y) in the polarization direction with "α1=45°" at the target pixel position "x, y". Furthermore, the polarizing-pixel averaging processing unit 52 calculates, on the basis of Expression (8), the pixel average value mP2(x, y) in the polarization direction with "α2=90°" at the target pixel position "x, y". Moreover, the polarizing-pixel averaging processing unit 52 calculates, on the basis of Expression (9), the pixel average value mP3(x, y) in the polarization direction with "α3=135°" at the target pixel position "x, y".

$$mP0(x,y)=P(x,y) \tag{6}$$

$$mP1(x,y)=(P(x-1,y)+P(x+1,y))/2 \tag{7}$$

$$mP2(x,y)=(P(x-1,y-1)+P(x+1,y-1)+P(x-1,y+1)+P(x+1,y+1))/4 \tag{8}$$

$$mP3(x,y)=(P(x,y-1)+P(x,y+1))/2 \tag{9}$$

The non-polarizing-pixel averaging processing unit 53 uses the target pixel and the peripheral pixels of the target pixel in the non-polarized image, and calculates a pixel average value from the pixel value at the pixel position equal to the case of calculating the pixel average value per polarization direction. For example, the non-polarizing-pixel averaging processing unit 53 calculates, on the basis of Expression (10), the pixel average value mQ0(x, y) relative to the pixel average value in the polarization direction with "α0=0°", at the target pixel position "x, y". Similarly, the non-polarizing-pixel averaging processing unit 53 calculates, on the basis of Expression (11), the pixel average value mQ1(x, y) relative to the pixel average value in the polarization direction with "α1=45°". Furthermore, the non-polarizing-pixel averaging processing unit 53 calculates, on the basis of Expression (12), the pixel average value mQ2(x, y) relative to the pixel average value in the polarization direction with "α2=90°". Moreover, the non-polarizing-pixel averaging processing unit 53 calculates, on the basis of Expression (13), the pixel average value mQ3(x, y) relative to the pixel average value in the polarization direction with "α3=135°".

$$mQ0(x,y)=Q(x,y) \tag{10}$$

$$mQ1(x,y)=(Q(x-1,y)+Q(x+1,y))/2 \tag{11}$$

$$mQ2(x,y)=(Q(x-1,y-1)+Q(x+1,y-1)+Q(x-1,y+1)+Q(x+1,y+1))/4 \tag{12}$$

$$mQ3(x,y)=(Q(x,y-1)+Q(x,y+1))/2 \tag{13}$$

The correlation processing unit 55 determines that there is a positive correlation between the polarizing pixels and the non-polarizing pixels, and calculates a pixel value per polarization direction at the target pixel position, from the pixel average value calculated from the polarized image, the pixel average value calculated from the non-polarized image, and the pixel value of the target pixel in the non-polarized image.

For example, the correlation processing unit 55 calculates, on the basis of Expression (14), the pixel value P0(x, y) of the polarizing pixel in the polarization direction with "α0=0°" at the target pixel position "x, y". Similarly, the correlation processing unit 55 calculates, on the basis of Expression (15), the pixel value P1(x, y) of the polarizing pixel in the polarization direction with "α1=45°" at the target pixel position "x, y". Furthermore, the correlation processing unit 55 calculates, on the basis of Expression (16), the pixel value P2(x, y) of the polarizing pixel in the polarization direction with "α2=90°" at the target pixel position "x, y". Moreover, the correlation processing unit 55 calculates, on the basis of Expression (17), the pixel value P3(x, y) of the polarizing pixel in the polarization direction with "α3=135°" at the target pixel position "x, y". Note that the correlation processing unit 55 outputs the pixel value Q(x, y) as the pixel value of the target pixel of the non-polarized image.

$$P0(x,y)=mP0(x,y)\cdot Q(x,y)/mQ0(x,y) \tag{14}$$

$$P1(x,y)=mP1(x,y)\cdot Q(x,y)/mQ1(x,y) \tag{15}$$

$$P2(x,y)=mP2(x,y)\cdot Q(x,y)/mQ2(x,y) \tag{16}$$

$$P3(x,y)=mP3(x,y)\cdot Q(x,y)/mQ3(x,y) \tag{17}$$

The demosaicing unit performs the above-described processing using each pixel of the polarized image as a target pixel, thereby generating a polarization component image per polarization direction. Furthermore, in the second embodiment of the demosaicing unit, the signal component of the non-polarizing pixel is normalized by the pixel average value and superimposed on the polarizing pixel. Therefore, for example, problems such as folding caused due to the frequency limit of the polarizing pixel can be improved and there can be generated, per polarization direction, a polarization component image having a resolution equivalent to that of the non-polarized image. Note that, in a case where the pixel processing unit 30 is not provided, the demosaicing unit 50 performs the processing performed by the pixel processing unit 30, and generates an image or a non-polarized image in which the pixel disposition corresponding to a Bayer arrangement includes polarizing pixels and non-polarizing pixels.

<1-5. Polarization Information Generating Unit>

The polarization information generating unit 60 uses the polarization component image and the non-polarized image generated by the demosaicing unit 50 to generate polarization information.

Figure 18:
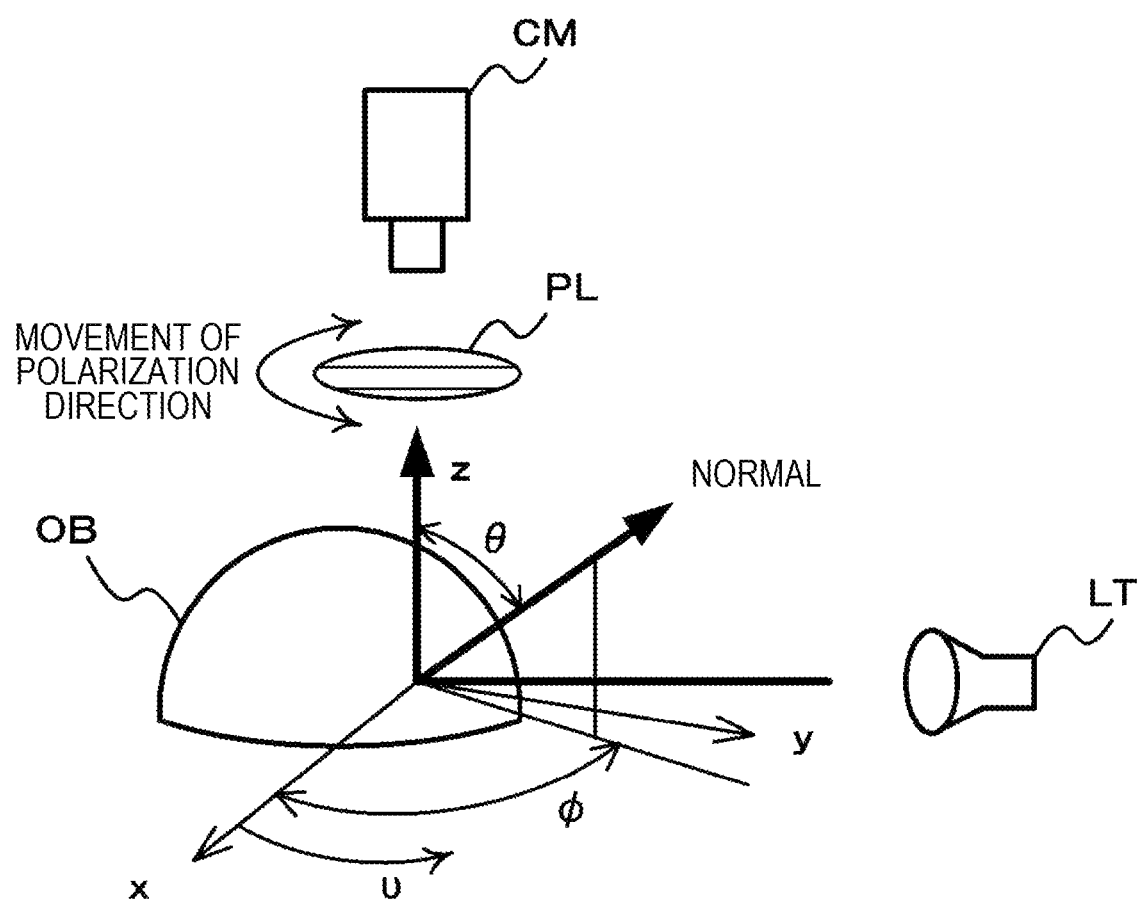
FIG. 18 is a view for describing the relationship between a shape of a subject and a polarized image.

Here, the relationship between the subject and the polarized image will be described with FIG. 18. For example, as illustrated in FIG. 18, a light source LT is used to illuminate a subject OB, and a camera CM captures the subject OB through a polarizing plate PL. In this case, for the captured image, the luminance of the subject OB changes in accordance with the polarization direction of the polarizing plate PL. Note that, in order to facilitate the description, for example, capturing is performed by rotation of the polarizing plate PL to acquire a plurality of polarized images, and the highest luminance is defined as Imax and the lowest luminance is defined as Imin. Furthermore, when the x-axis and the y-axis in the two-dimensional coordinates are on the plane of the polarizing plate PL, the angle in the y-axis direction with respect to the x-axis when the polarizing plate PL rotates is defined as the polarization angle $\upsilon$.

When rotating by 180 degrees, the polarizing plate PL returns to the original polarization state and has periods of 180 degrees. Furthermore, the polarization angle $\upsilon$ when the maximum luminance Imax is observed is defined as the azimuth angle $\phi$ (polarization phase of the observed light). When such a definition is made, the luminance I observed when the polarizing plate PL rotates can be expressed by the following Expression (18). Furthermore, Expression (18) can also be expressed as Expression (19). Note that, in Expression (19), the polarization parameter Wa, the polarization parameter Wb, and the polarization parameter Wc are values calculated with Expression (20), Expression (21), and Expression (22), respectively.

[Mathematical Formula 4]

$$I = \frac{I_{max} + I_{min}}{2} + \frac{I_{max} - I_{min}}{2}\cos(2(v - \varphi)) \quad (18)$$

$$I = Wa \cdot \sin(2 \cdot v) + Wb \cdot \cos(2 \cdot v) + Wc \quad (19)$$

$$Wa = \frac{I_{max} - I_{min}}{2} \cdot \cos(2 - \varphi) \quad (20)$$

$$Wb = \frac{I_{max} - I_{min}}{2} \cdot \sin(-2 \cdot \varphi) \quad (21)$$

$$Wc = \frac{I_{max} + I_{min}}{2} \quad (22)$$

Figure 19:
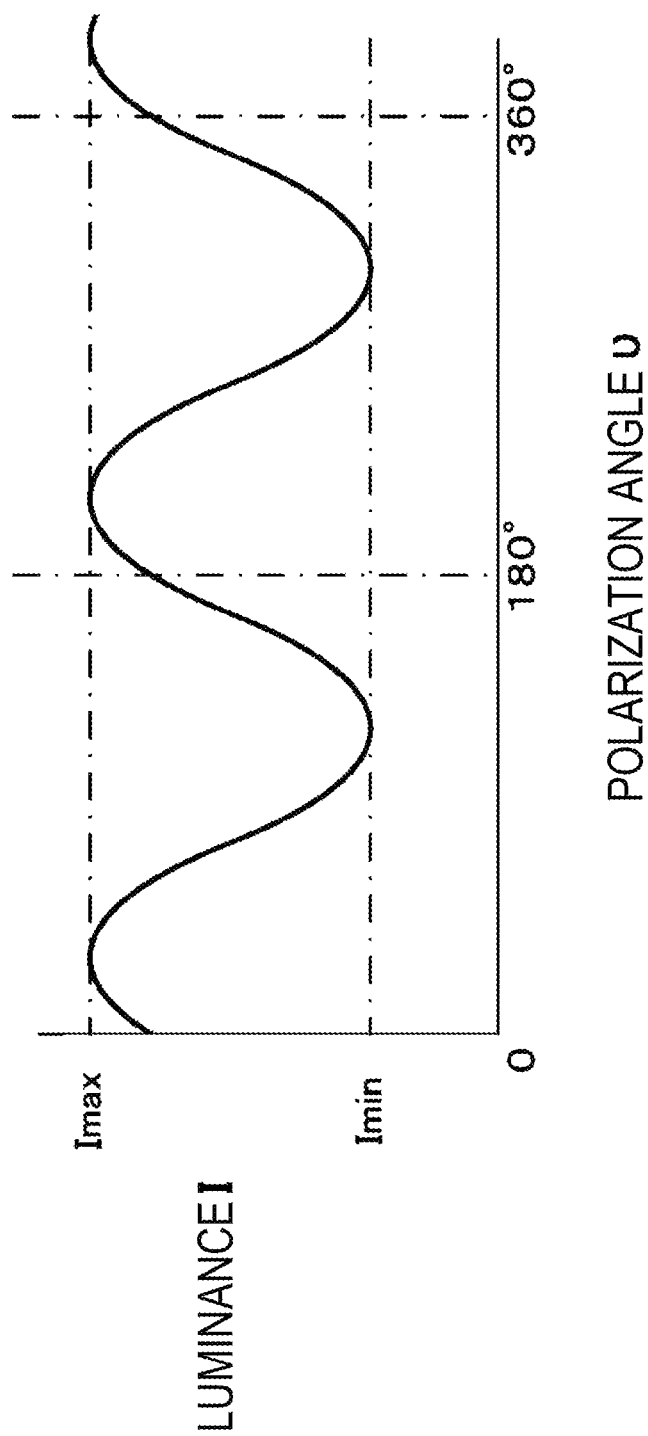
FIG. 19 is a graph exemplifying the relationship between luminance and a polarization angle.

FIG. 19 exemplifies the relationship between the luminance and the polarization angle. Furthermore, this example indicates a diffuse-reflection polarization model, and for specular reflection, the azimuth angle is shifted by 90 degrees from the polarization angle. For Expression (18) or (19) as a polarization model expression indicating the relationship between the luminance and the polarization angle, the polarization angle $\upsilon$ is obvious in generation of the polarized image, and the maximum luminance Imax, the minimum luminance Imin, and the azimuth angle $\phi$ are variables. Therefore, fitting to the polarization model expression indicating Expression (18) or (19) enables discrimination of the azimuth angle $\phi$ as the polarization angle having the maximum luminance, on the basis of the fitted polarization model expression.

<1-5-1. First Operation of Polarization Information Generating Unit>

Figure 20:
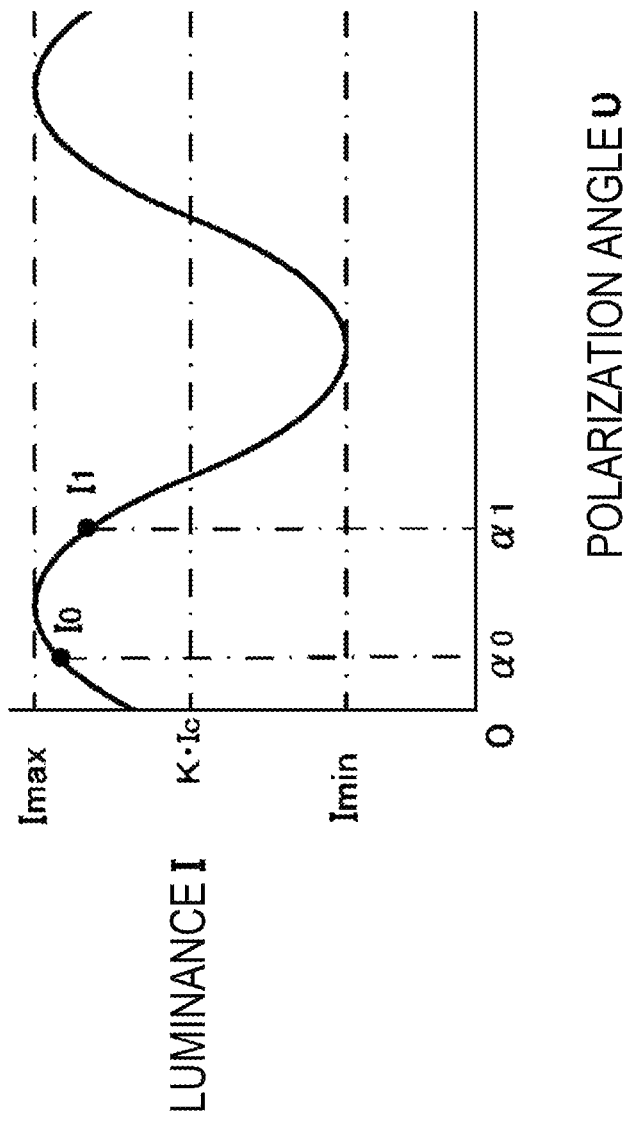
FIG. 20 is a graph for describing a case of calculating parameters of a polarization model expression from a polarization component image and a non-polarized image per two polarization directions.

For a first operation of the polarization information generating unit, there will be described with FIG. 20, a case of calculating the parameters of the polarization model expression of Expression (19) from a polarization component image per two polarization directions and a non-polarized image.

A target pixel in the polarization component image in the polarization direction with the polarization angle $\alpha 0$ is defines as luminance (pixel value) I0. Furthermore, a target pixel in the polarization component image in the polarization direction with the polarization angle $\alpha 1$ is defined as luminance (pixel value) I1.

The polarization information generating unit 60 uses the luminance (pixel value) Ic of the non-polarizing pixel, and calculates the polarization parameter Wc, on the basis of Expression (23). The coefficient K in Expression (23) is a coefficient for absorbing the difference in sensitivity between the polarizing pixels and the non-polarizing pixels, and the luminance Ic is the pixel value of the non-polarizing pixel. For the first embodiment of the image pickup unit 20, the coefficient K is a coefficient for equalizing the pixel value of the non-polarizing pixel and the pixel value of the polarizing pixel when a predetermined subject is captured in advance. Furthermore, for the second embodiment of the image pickup unit 20, the coefficient K is a coefficient further including the operation of the pixel control unit, and in a case where the pixel control unit performs control of making the polarizing pixels identical in sensitivity to the non-polarizing pixels, the coefficient K satisfies "K=1". Therefore, in a case where the polarizing pixels and the non-polarizing pixels are equal in sensitivity as in the second embodiment of the image pickup unit 20, the luminance (pixel value) of the non-polarizing pixels equal in sensitivity to the polarizing pixels corresponds to the polarization parameter Wc.

$$Wc = K \cdot Ic \quad (23)$$

The polarization information generating unit 60 uses, for example, the least squares method to calculate the polarization parameters Wa and Wb in the polarization model expression of Expression (19) on the basis of the polarizing pixels in two polarization directions and the non-polarizing pixels. Here, the polarization parameter x is defined as in Expression (24). Furthermore, the polarization model A is defined as in Expression (25). Moreover, the luminance y is defined as in Expression (26). In a case where the polarization parameter x, the polarization model A, and the luminance y are defined as described above, ideally y=Ax is established. Therefore, the polarization parameter x is calculated on the basis of Expression (27) with the least squares method.

[Mathematical Formula 5]

$$x = \begin{bmatrix} Wa \\ Wb \end{bmatrix} \quad (24)$$

$$A = \begin{bmatrix} \sin(2\cdot\alpha_0) & \cos(2\cdot\alpha_0) \\ \sin(2\cdot\alpha_1) & \cos(2\cdot\alpha_1) \end{bmatrix} \quad (25)$$

$$y = \begin{bmatrix} I_0 - K\cdot I_C \\ I_1 - K\cdot I_C \end{bmatrix} \quad (26)$$

$$x = (A^T A)^{-1} A^T y \quad (27)$$

Here, as illustrated in (a) of FIG. 4, in a case where the polarization direction has "$\alpha 0=0°$ and $\alpha 1=45°$", the polarization parameter Wa and the polarization parameter Wb are values calculated with Expression (28) and Expression (29), respectively. Furthermore, the polarization parameter Wc is the value calculated with Expression (23).

$$Wa = I1 - K\cdot Ic \quad (28)$$

$$Wb = I0 - K\cdot Ic \quad (29)$$

Furthermore, in a case where the polarization direction has "$\alpha 0=22.5°$ and $\alpha 1=67.5°$" as in the third embodiment of the image pickup unit, the polarization parameter Wa and the polarization parameter Wb are values calculated with Expression (30) and Expression (31), respectively. Note that the polarization parameter Wc is the value calculated with Expression (23).

[Mathematical Formula 6]

$$Wa = \frac{I_0 + I_1 - 2\cdot K\cdot I_C}{\sqrt{2}} \quad (30)$$

$$Wb = (I_0 - I_1)/\sqrt{2} \quad (31)$$

The polarization information generating unit 60 calculates the polarization parameters Wa, Wb, and Wc to acquire the polarization model expression, and generates polarization information indicating the acquired polarization model expression.

<1-5-2. Second Operation of Polarization Information Generating Unit>

Figure 21:
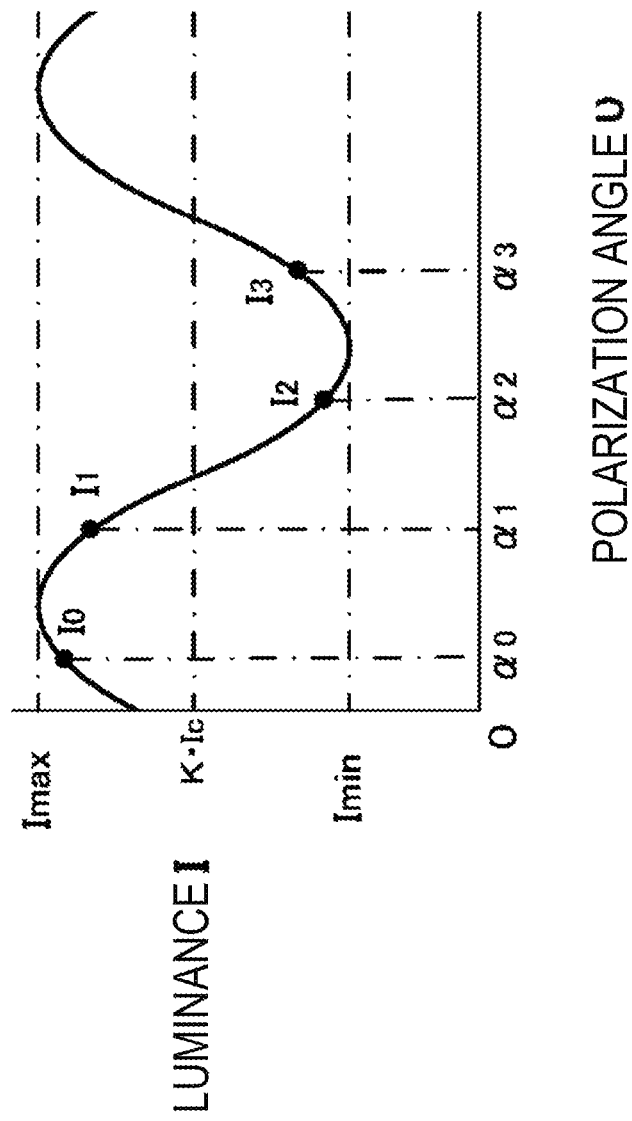
FIG. 21 is a graph for describing a case of calculating parameters of a polarization model expression from a polarization component image and a non-polarized image per four polarization directions.

For a second operation of the polarization information generating unit, there will be described with FIG. 21, a case where the parameters of the polarization model expression in Expression (19) from a polarization component image per four polarization directions and a non-polarized image.

The polarization information generating unit 60 uses, for example, the least squares method to calculate the polarization parameters Wa, Wb, and Wc in the polarization model expression in Expression (19). Note that a target pixel in the polarization component image in the polarization direction with "$\alpha 0=0°$" is defined as luminance (pixel value) I0. Furthermore, a target pixel in the polarization component image in the polarization direction with "$\alpha 1=45°$, $\alpha 2=90°$, and $\alpha 3=135°$" is defined as luminance (pixel value) I1, I2, and I3.

The polarization information generating unit 60 defines the polarization parameter x as in Expression (24). Furthermore, the polarization model A is defined as in Expression (32). Moreover, the luminance y is defined as in Expression (33). In a case where the polarization parameter x, the polarization model A, and the luminance y are defined as described above, ideally y=Ax is established. Therefore, similarly in the first operation, the polarization parameter x is calculated on the basis of Expression (27) with the least squares method.

[Mathematical Formula 7]

$$A = \begin{bmatrix} \sin(2\cdot\alpha_0) & \cos(2\cdot\alpha_0) \\ \sin(2\cdot\alpha_1) & \cos(2\cdot\alpha_1) \\ \sin(2\cdot\alpha_2) & \cos(2\cdot\alpha_2) \\ \sin(2\cdot\alpha_3) & \cos(2\cdot\alpha_3) \end{bmatrix} \quad (32)$$

$$y = \begin{bmatrix} I_0 - K\cdot I_C \\ I_1 - K\cdot I_C \\ I_2 - K\cdot I_C \\ I_3 - K\cdot I_C \end{bmatrix} \quad (33)$$

Here, in a case where the polarization direction has "$\alpha 0=0°$, $\alpha 1=45°$, $\alpha 2=90°$, and $\alpha 3=135°$", the polarization parameter Wa, the polarization parameter Wb, and the polarization parameter Wc are values calculated with Expression (34), Expression (35), and Expression (23), respectively.

$$Wa = (I1-I3)/2 \quad (34)$$

$$Wb = (I0-I2)/2 \quad (35)$$

Furthermore, as in the third embodiment of the image pickup unit, in a case where the polarization direction has "$\alpha 0=22.5°$, $\alpha 1=67.5°$, $\alpha 2=112.5°$, and $\alpha 3=157.5°$", the polarization parameter Wa and the polarization parameter Wb are values calculated with Expression (36) and Expression (37), respectively. Furthermore, the polarization parameter Wc is the value calculated with Expression (23).

[Mathematical Formula 8]

$$Wa = \frac{I_1 + I_2 - I_3 - I_4}{2\cdot\sqrt{2}} \quad (36)$$

$$Wb = \frac{I_1 - I_2 - I_3 + I_4}{2\cdot\sqrt{2}} \quad (37)$$

Note that in a case where only the polarization component image is used, the polarization parameter Wc may be calculated with Expression (38).

$$Wc = (I0+I1+I2+I3)/4 \quad (38)$$

As described above, the polarization information generating unit 60 calculates the polarization parameters Wa, Wb, and Wc to acquire the polarization model expression, and generates the polarization information indicating the acquired polarization model expression.

Furthermore, in a case where the polarizing pixels in the image pickup unit include pixels in two polarization directions, when a pixel value is saturated in any one of the polarizing pixels, correct polarization information cannot be generated. However, in a case where the polarizing pixels in the image pickup unit include pixels in four polarization directions, even when a pixel value is saturated in any one of the pixels in the four polarization directions, the three polarization parameters can be calculated with the other three polarizing pixels. Therefore, compared with the case where the image pickup unit includes the polarizing pixels in two polarization directions, robust can be achieved for loss of pixel value due to the saturation or the like.

<1-6. Normal Information Generating Unit>

On the basis of the polarization information generated by the polarization information generating unit 60, the normal information generating unit 70 generates normal information, for example, normal information indicating an azimuth angle and a zenithal angle.

The normal information generating unit 70 calculates the azimuth angle ϕ, for example, on the basis of Expression (39), for example. Furthermore, the normal information generating unit 70 calculates the zenithal angle θ on the basis of Expression (40). Note that the parameters A, B, C, and D in Expression (40) are values calculated with Expressions (41), (42), (43), and (44), respectively, and the degree of polarization p indicated in Expressions (40) and (41) is calculated on the basis of Expression (45). Furthermore, in Expressions (41), (43), and (44), the parameters A, C, and D are calculated with the refractive index n of the subject OB.

[Mathematical Formula 9]

$$\varphi = \frac{1}{2}\arcsin\left(\frac{Wa}{\sqrt{Wa^2 + Wb^2}}\right) \text{ or } \frac{1}{2}\arccos\left(\frac{Wa}{\sqrt{Wa^2 + Wb^2}}\right) \quad (39)$$

$$\theta = \arcsin\left(\sqrt{-B\frac{C(A+B) - \sqrt{C^2(A+B)^2 - D^2(A^2 - B^2)}}{2(A^2 - B^2)}}\right) \quad (40)$$

$$A = 2(1-\rho) - (1+\rho)\left(n^2 + \frac{1}{n^2}\right) \quad (41)$$

$$B = 4\rho \quad (42)$$

$$C = 1 + n^2 \quad (43)$$

$$D = 1 - n^2 \quad (44)$$

$$\rho = \frac{\sqrt{Wa^2 + Wb^2}}{Wc} \quad (45)$$

Figure 22:
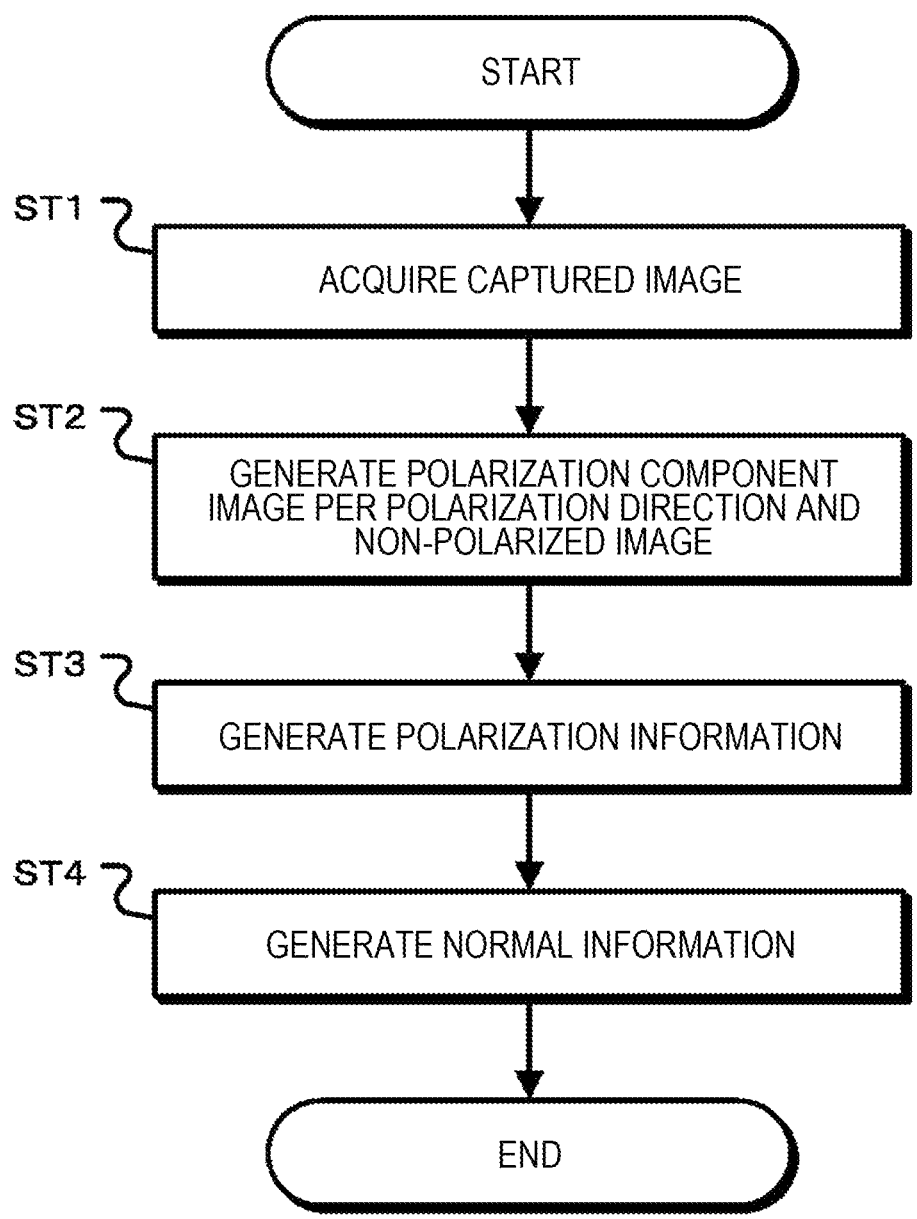
FIG. 22 is a flowchart illustrating processing of an embodiment of the image processing apparatus.

FIG. 22 is a flowchart illustrating the processing of the embodiment of the image processing apparatus. In step ST1, the image processing apparatus acquires a captured image. The image processing apparatus uses the image pickup unit including polarizing pixels and non-polarizing pixels to generate the captured image and proceeds to step ST2.

In step ST2, the image processing apparatus generates a polarization component image per polarization direction and a non-polarized image. The image processing apparatus 10 uses the captured image to perform demosaicing and generates the polarization component image as a polarized image per polarization direction and the non-polarized image. Furthermore, the image processing apparatus 10 uses the non-polarized image to generate the polarization component image having a high image quality. Moreover, in the image processing apparatus 10, the non-polarized image may be used to remove noise from the polarizing pixel in the captured image, and demosaicing may be performed. The image processing apparatus 10 generates the polarization component image and the non-polarized image, and proceeds to step ST3.

In step ST3, the image processing apparatus generates polarization information. The image processing apparatus 10 performs fitting to a polarization model expression on the basis of a pixel value per polarization direction and a non-polarizing pixel value in a target pixel to generate the polarization information indicating the fitted polarization model expression, and proceeds to step ST4.

In step ST4, the image processing apparatus generates normal information. The image processing apparatus 10 calculates an azimuth angle and a zenithal angle at the target pixel on the basis of the polarization information generated in step ST3, and generates the normal information indicating the calculated azimuth angle and the zenithal angle.

As described above, the image processing apparatus generates the non-polarized image and the polarization component image per polarization direction by the demosaicing unit 50, from the captured image generated by the image pickup unit 20 in which the non-polarizing pixels and the polarizing pixels per at least two polarization directions are disposed. Furthermore, the image processing apparatus generates, by the polarization information generating unit 60, the polarization information indicating the polarization characteristics of the subject included in the captured image, from the non-polarized image and the polarization component image generated by the demosaicing unit 50. As described above, the polarization information is generated with not only the polarization component image but also the highly-sensitive non-polarized image. Therefore, high-accurate polarization information can be acquired compared to a case where polarization information is generated on the basis of the polarization component image. Furthermore, the demosaicing unit 50 is capable of generating the high-resolution polarization component image per polarization direction, by using the non-polarized image. Furthermore, the noise removal unit can highly accurately perform noise removal of the polarized image and the polarizing pixel, with the highly-sensitive non-polarized image.

2. Other Embodiments

Figure 23:
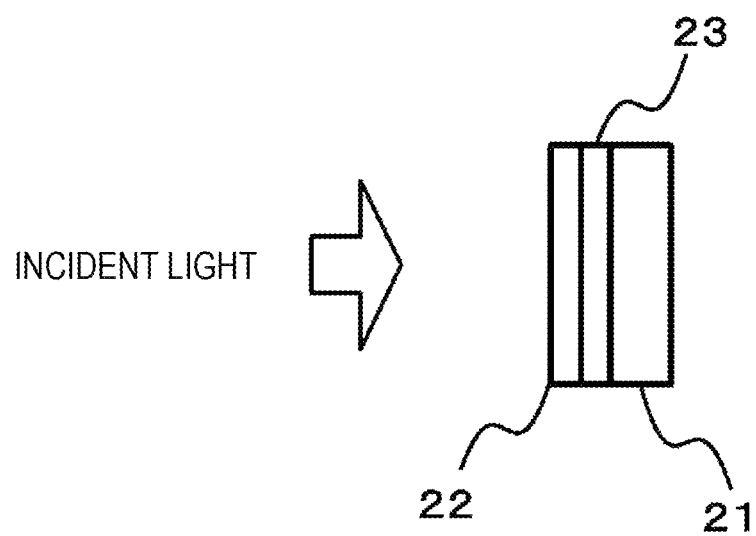
FIG. 23 is a view exemplifying the configuration of an image pickup unit that generates a color image.

Meanwhile, for the above-described image processing apparatus, there has been described the case where the captured image generated by the image pickup unit is a monochrome image; however, the captured image may be a color image. FIG. 23 exemplifies the configuration of an image pickup unit that generates a color image. In a case where a color image is generated by an image pickup unit 20, a color mosaic filter 23 is provided on the incidence face of an image sensor 21. Note that the color mosaic filter 23 is not limited to being provided between the image sensor 21 and a polarizing filter 22, but may be provided on the incidence face of the polarizing filter 22.

The polarizing filter 22 and the color mosaic filter 23 each have a configuration provided with pixels in each direction identical in color such that polarizing pixels different in polarization direction are not affected due to difference in color. Furthermore, the polarizing filter 22 and the color mosaic filter 23 are configured such that pixel values of the non-polarizing pixels in each color are acquired.

Figure 24:
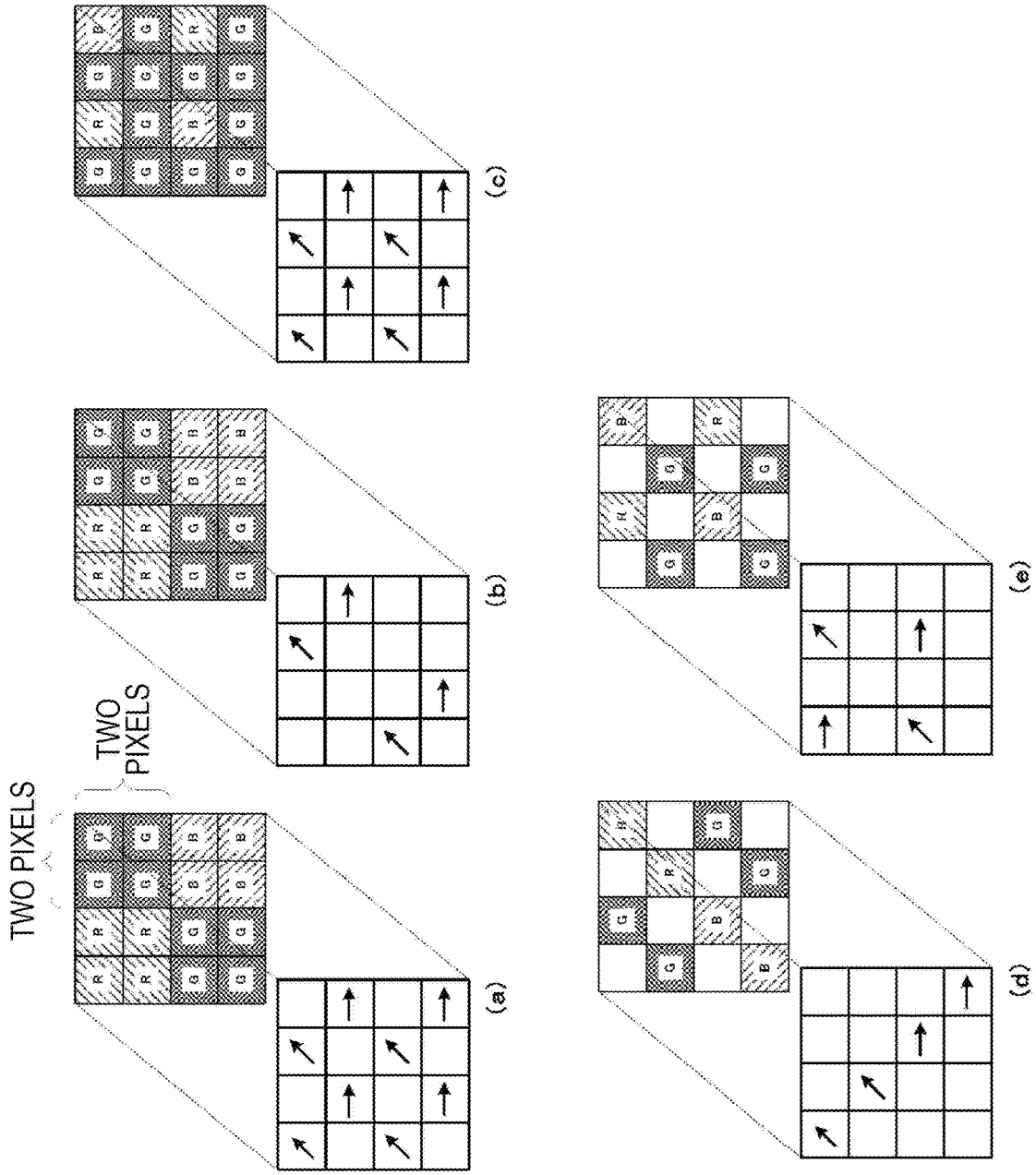
FIG. 24 is a view exemplifying the relationship between a color mosaic filter and a polarizing filter (two polarization directions).

FIG. 24 exemplifies the relationship between the color mosaic filter and the polarizing filter (two polarization directions). In (a) of FIG. 24, the polarizing filter 22 has a configuration in which two polarizing pixels different in polarization direction and two non-polarizing pixels are received in each 2×2 pixel region. Furthermore, the color mosaic filter 23 has a configuration in which each 2×2 pixel region includes a color unit of red (R), green (G), or blue (B), and a 4×4 pixel region includes a red 2×2 pixel region, a blue 2×2 pixel region, and two green 2×2 pixel regions. In this case, in the image pickup unit 20, per 2×2 pixel region, there are generated the pixel values of the polarizing pixels per two polarization directions and the pixel values of the non-polarizing pixels of any of red, green, or blue.

In (b) of FIG. 24, the color mosaic filter 23 has a configuration in which each 2×2 pixel region includes a color unit of red (R), green (G), or blue (B). Furthermore, the polarizing filter 22 has a configuration in which two polarizing pixels different in polarization direction and two non-polarizing pixels are received in each green 2×2 pixel region, and a 4×4 pixel region includes a red 2×2 pixel region, a blue 2×2 pixel region, and two green 2×2 pixel regions. In this case, in the image pickup unit 20, per 2×2 pixel region, there are generated the pixel values of the non-polarizing pixels of any of red, green, or blue, and the pixel values of the polarizing pixels in two polarization directions in green.

In (c) of FIG. 24, the polarizing filter 22 has a configuration in which two polarizing pixels different in polarization direction and two non-polarizing pixels are received in each 2×2 pixel region. Furthermore, the color mosaic filter 23 has a configuration in which each 2×2 pixel region includes three green (G) pixels and one red (R) or blue (B) pixel, and a 4×4 pixel region includes two 2×2 pixel regions including red pixels and two 2×2 pixel regions including blue pixels. In this case, in the image pickup unit 20, per 2×2 pixel region, there are generated the pixel values of the non-polarizing pixels that are green pixels and a red pixel, or green pixels and a blue pixel, and the pixel values of the polarizing pixels per two polarization directions in green.

In (d) of FIG. 24, the color mosaic filter 23 has a configuration in which each 2×2 pixel region includes two white pixels and two pixels of red (R), green (G), or blue (B). Furthermore, a 4×4 pixel region includes a 2×2 pixel region including red pixels, a 2×2 pixel region including blue pixels, and two 2×2 pixel regions including green pixels. Furthermore, the polarizing filter 22 has a configuration in which white pixels as polarizing pixels equal in polarization direction are included in a 2×2 pixel region including green pixels, and two polarizing pixels in each of two polarization directions are provided in a 4×4 pixel region. In this case, in the image pickup unit 20, per 2×2 pixel region, there are generated the pixel values of the non-polarizing pixels of any of red, green, or blue, and the pixel values of the polarizing pixels in any polarization direction of two polarization directions in the 2×2 pixel region including green pixels.

In (e) of FIG. 24, the color mosaic filter 23 has a configuration in which each 2×2 pixel region includes two white pixels, a green (G) pixel, and a red (R) pixel, or two white pixels, a green (G) pixel, and a blue (B) pixel. Furthermore, a 4×4 pixel region includes two 2×2 pixel regions including red pixels and two 2×2 pixel regions including blue pixels. Furthermore, the polarizing filter 22 has a configuration in which one white pixel as a polarizing pixel is included in each 2×2 pixel region, and two polarizing pixels in each of two polarization directions are provided in a 4×4 pixel region. In this case, in the image pickup unit 20, per 2×2 pixel region, there are generated the pixel values of the non-polarizing pixels of green and red, or green or blue, and the pixel values of the polarizing pixels in any polarization direction of two polarization directions.

Furthermore, in FIG. 24, in the image pickup unit 20, per 4×4 pixel region, there are generated the pixel values of the non-polarizing pixels of each color and the pixel values of the polarizing pixels per polarization direction.

Figure 25:
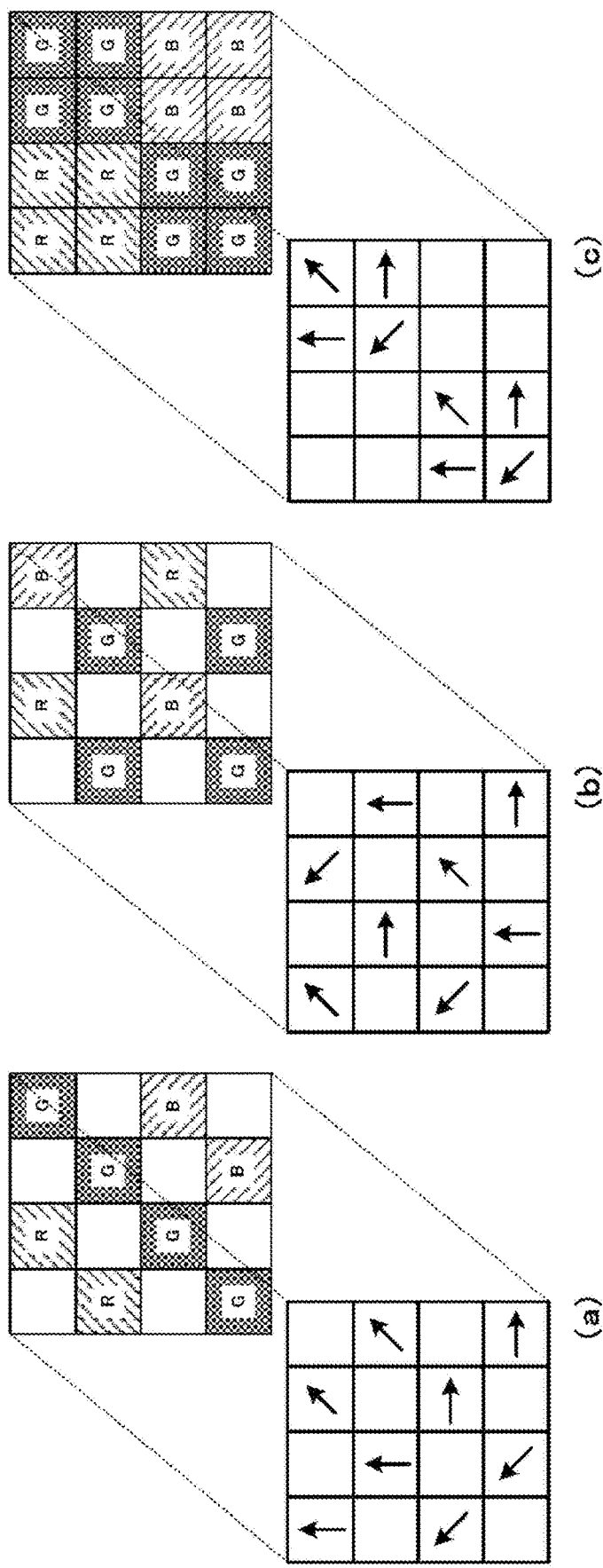
FIG. 25 is a view exemplifying the relationship between a color mosaic filter and a polarizing filter (four polarization directions).

FIG. 25 exemplifies the relationship between the color mosaic filter and the polarizing filter (four polarization directions). In (a) of FIG. 25, the color mosaic filter 23 has a configuration in which each 2×2 pixel region includes two white pixels and two pixels of any of red (R), green (G), or blue (B). Furthermore, a 4×4 pixel region includes a 2×2 pixel region including red pixels, a 2×2 pixel region including blue pixels, and two 2×2 pixel regions including green pixels. Furthermore, the polarizing filter 22 has a configuration in which white pixels as polarizing pixels in any polarization direction are included in each 2×2 pixel region, and two polarizing pixels in each of four polarization directions are provided in a 4×4 pixel region. In this case, in the image pickup unit 20, per 2×2 pixel region, there are generated the pixel values of the non-polarizing pixels of any of red, green, and blue and the pixel values of the polarizing pixels in any polarization direction of the four polarization directions.

In (b) of FIG. 25, the color mosaic filter 23 has a configuration in which each 2×2 pixel region includes two white pixels, a green (G) pixels, and a red (R) pixel, or two white pixels, a green (G) pixel, and a blue (B) pixel. Furthermore, a 4×4 pixel region includes two 2×2 pixel regions including red pixels and two 2×2 pixel regions including blue pixels. Furthermore, the polarizing filter 22 has a configuration in which two white pixels as polarizing pixels different in polarization direction are included in each 2×2 pixel region, and two polarizing pixels in each of four polarization directions are included in a 4×4 pixel region. In this case, in the image pickup unit 20, per 2×2 pixel region, there are generated the pixel values of the non-polarizing pixels of green and red, or green and blue, and the pixel values of the polarizing pixels in two polarization directions. In this case, in the image pickup unit 20, per 2×2 pixel region, there are generated the pixel values of the non-polarizing pixels of green and red, or green and blue, and the pixel values of the polarizing pixels in any two polarization directions of the four polarization directions.

In (c) of FIG. 25, the color mosaic filter 23 has a configuration in which each 2×2 pixel region includes a color unit of red (R), green (G), or blue (B), and a 4×4 pixel region includes a red 2×2 pixel region, a blue 2×2 pixel region, and two green 2×2 pixel regions. Furthermore, the polarizing filter 22 has a configuration in which four polarizing pixels each different in polarization direction are provided in each green 2×2 pixel region. In this case, in the image pickup unit 20, the pixel values of the non-polarizing pixels are generated in the red or blue 2×2 pixel region, and the pixel values of the polarizing pixels in each polarization direction are generated in the green 2×2 pixel regions.

Furthermore, in (a) and (b) of FIG. 25, in the image pickup unit 20, per 4×4 pixel region, there are generated the pixel values of the non-polarizing pixels of each color, and the pixel values of the polarizing pixels per polarization direction.

In a case where a color captured image is generated by the image pickup unit 20, in the demosaicing unit 50, a non-polarized image per color component is generated from the color captured image. Furthermore, the demosaicing unit 50 generates a polarization component image per polarization direction. The polarization information generating unit 60 uses the polarization component image and the non-polarized image generated by the demosaicing unit 50 to generate the polarization information. The polarizing pixels are pixels of white or identical in color as described above, so that the polarizing pixels are not affected due to difference in color. Therefore, the polarization information can be correctly generated even in use of the color captured image. Note that, in (c) of FIG. 25, the green pixels are polarizing pixels, so that the green pixels are lower in sensitivity than the red pixels or the blue pixels that are non-polarizing pixels. Therefore, performing of correction according to the lower sensitivity of the polarizing pixels for the pixel values of the green pixels enables generation of a color component image similar to a case where a pixel of each color component is a non-polarizing pixel obtained by performing the conventional demosaicing on a Bayer arrangement.

As described above, the generation of the color captured image by the image pickup unit enables the generation of the high accurate polarization information by using colors. Furthermore, in the case where the color captured image is generated by the image pickup unit, the pixel processing unit 30 can generate the non-polarized image per color by performing unification processing with the pixels identical in color.

Furthermore, the configuration of the image processing apparatus is not limited to the configuration illustrated in FIG. 1. For example, the pixel processing unit 30 has the configuration in accordance with the pixel configuration of the image pickup unit 20 as described above. Thus, the image pickup unit 20 and the pixel processing unit 30 may be integrally formed. Furthermore, in a case where the image pickup unit 20 is used only, for example, in an image capturing environment in which effect due to the lower sensitivity of the polarizing pixel is not occur, the noise removal unit 40 may be omitted.

3. Application Example

The technology according to the present disclosure is applicable to various products. For example, the technology according to the present disclosure may be provided as an apparatus with which any type of movable objects is to be equipped, such as an automobile, electric vehicle, hybrid electric vehicle, motorcycle, bicycle, personal mobility, airplane, drone, ship, robot, construction machine, agricultural machine (tractor).

Figure 26:
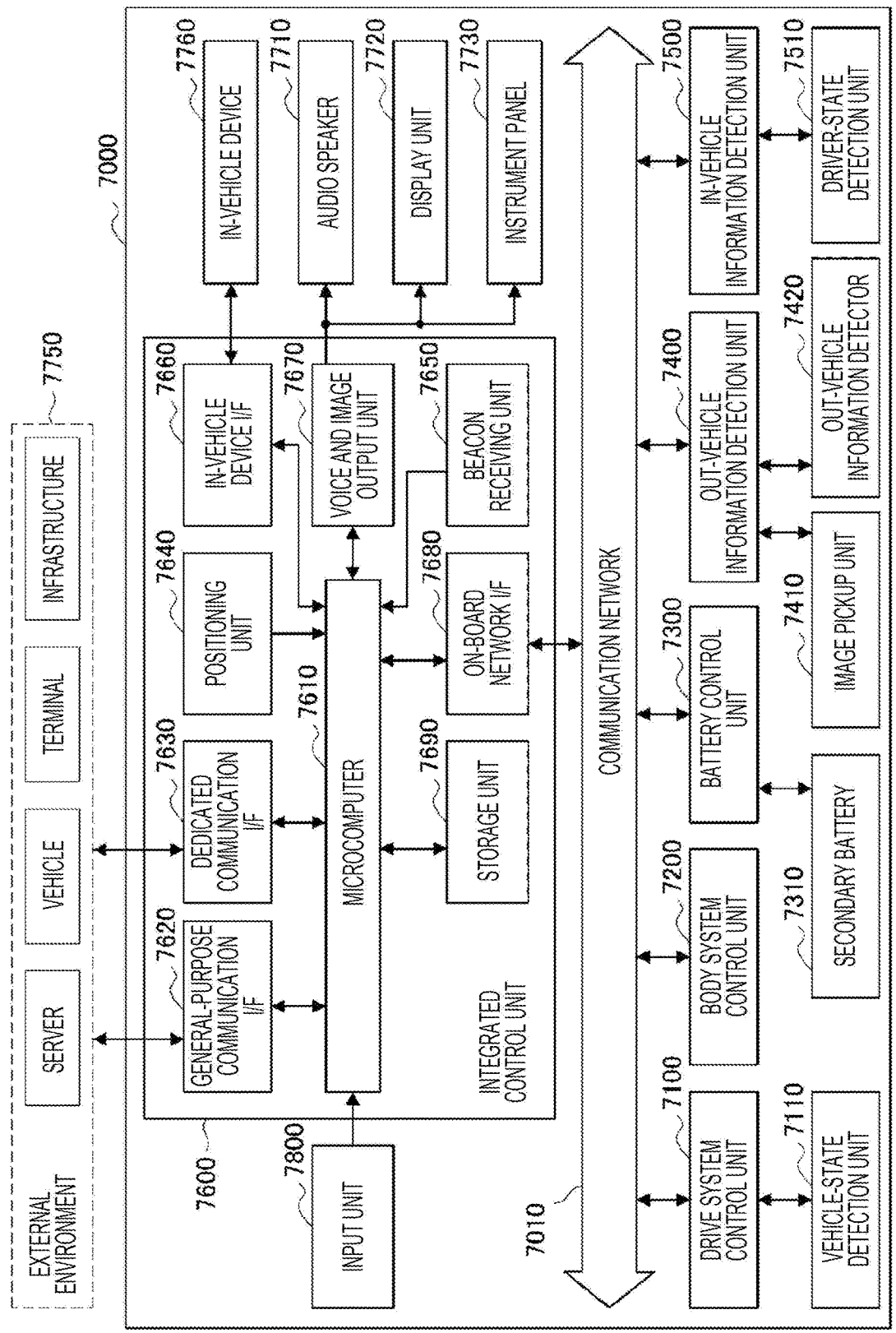
FIG. 26 is a block diagram illustrating an example of a schematic configuration of a vehicle control system.

FIG. 26 is a block diagram illustrating a schematic configuration example of a vehicle control system 7000 as an example of a movable-object control system to which the technology according to the present disclosure is applicable. The vehicle control system 7000 includes a plurality of electronic control units connected via a communication network 7010. In the example illustrated in FIG. 26, the vehicle control system 7000 includes: a drive system control unit 7100; a body system control unit 7200; a battery control unit 7300; an out-vehicle information detection unit 7400; an in-vehicle information detection unit 7500; and an integrated control unit 7600. The communication network 7010 connecting the plurality of control units may be, for example, an on-board communication network conforming to any standard such as controller area network (CAN), local interconnect network (LIN), local area Network (LAN), or FlexRay (registered trademark).

The control units each include: a microcomputer that performs computing processing in accordance with various programs; a storage unit that stores a program to be executed by the microcomputer, a parameter to be used for various types of computing, or the like; and a drive circuit that drives devices to be controlled variously. In addition to a network I/F for communicating with another control unit through the communication network 7010, the control units each include a communication I/F for communicating with the in-vehicle or out-vehicle devices, or with sensors and the like, with wired communication or wireless communication. As a functional configuration of the integrated control unit 7600, in FIG. 26, there are illustrated a microcomputer 7610; a general-purpose communication I/F 7620; a dedicated communication I/F 7630; a positioning unit 7640; a beacon receiving unit 7650; an in-vehicle device I/F 7660; a voice and image output unit 7670; an on-board network I/F 7680; and a storage unit 7690. Similarly, the other control units each include a microcomputer, a communication I/F, a storage unit, and the like.

The drive system control unit 7100 controls the operation of a device related to the drive system of the vehicle, in accordance with various programs. For example, the drive system control unit 7100 functions as a control device such as: a driving force generating device that generates a driving force of a vehicle, such as an internal combustion engine or a driving motor; a driving force transmitting mechanism that transmits a driving force to the wheels; a steering mechanism that adjusts a steering angle of the vehicle; and a braking device that generates a braking force of the vehicle. The drive system control unit 7100 may have a function as a control device such as an antilock brake system (ABS) or an electronic stability control (ESC).

A vehicle-state detection unit 7110 is connected to the drive system control unit 7100. For example, the vehicle-state detection unit 7110 includes at least one of a gyro sensor that detects the angular velocity of the shaft rotational motion of the vehicle body, an acceleration sensor that detects the acceleration of the vehicle, or a sensor that detects, for example, the operation amount of the accelerator pedal, the operation amount of the brake pedal, a steering angle of the steering wheel, the number of revolution of the engine, or the rotation speed of the wheels. The drive system control unit 7100 performs computing processing with a signal input from the vehicle-state detection unit 7110 to control the internal combustion engine, the driving motor, an electric power steering device, a brake device, or the like.

The body system control unit 7200 controls the operation of the various devices built into the vehicle body, in accordance with various programs. For example, the body system control unit 7200 functions as a keyless entry system, a smart key system, a power window device, or a control device for various lamps such as a head lamp, a back-up lamp, a brake lamp, a direction indicator, or a fog lamp. In this case, the body system control unit 7200 is capable of receiving an input of radio waves transmitted from a portable device that substitutes a key, or an input of signals of various switches. The body system control unit 7200 receives the input of these radio waves or signals, and controls the door lock device, power window device, lamp, and the like of the vehicle.

The battery control unit 7300 controls a secondary battery 7310 serving as a power supply source of the driving motor, in accordance with various programs. For example, information regarding, for example, battery temperature, battery output voltage, and battery remaining capacity is input the battery control unit 7300 from a battery device including the secondary battery 7310. The battery control unit 7300 performs computing processing with these signals to control the temperature adjustment of the secondary battery 7310 or a cooling device or the like included in the battery device.

The out-vehicle information detection unit 7400 detects information regarding the outside the vehicle equipped with the vehicle control system 7000. For example, at least one of an image pickup unit 7410 or an out-vehicle information detector 7420 is connected to the out-vehicle information detection unit 7400. The image pickup unit 7410 includes at least one of a time of flight (ToF) camera, a stereo camera, a single-eye camera, an infrared camera, or a different camera. The out-vehicle information detector 7420 includes, for example, at least one of an environmental sensor for detecting the current weather or climate, or a peripheral information detection sensor for detecting another vehicle, an obstacle, a pedestrian, or the like in the periphery of the vehicle equipped with the vehicle control system 7000.

The environmental sensor may be, for example, at least one of a raindrop sensor for detecting rainy weather, a fog sensor for detecting fog, a sunlight sensor for detecting sunlight degree, or a snow sensor for detecting snowfall. The peripheral information detection sensor may be at least one of an ultrasonic sensor, a radar device, or a light detection and ranging, laser imaging detection and ranging (LIDAR) device. Each of the image pickup unit 7410 and the out-vehicle information detector 7420 may be provided as an independent sensor or device, or may be provided as a device in which a plurality of sensors or a plurality of devices is unified.

Figure 27:
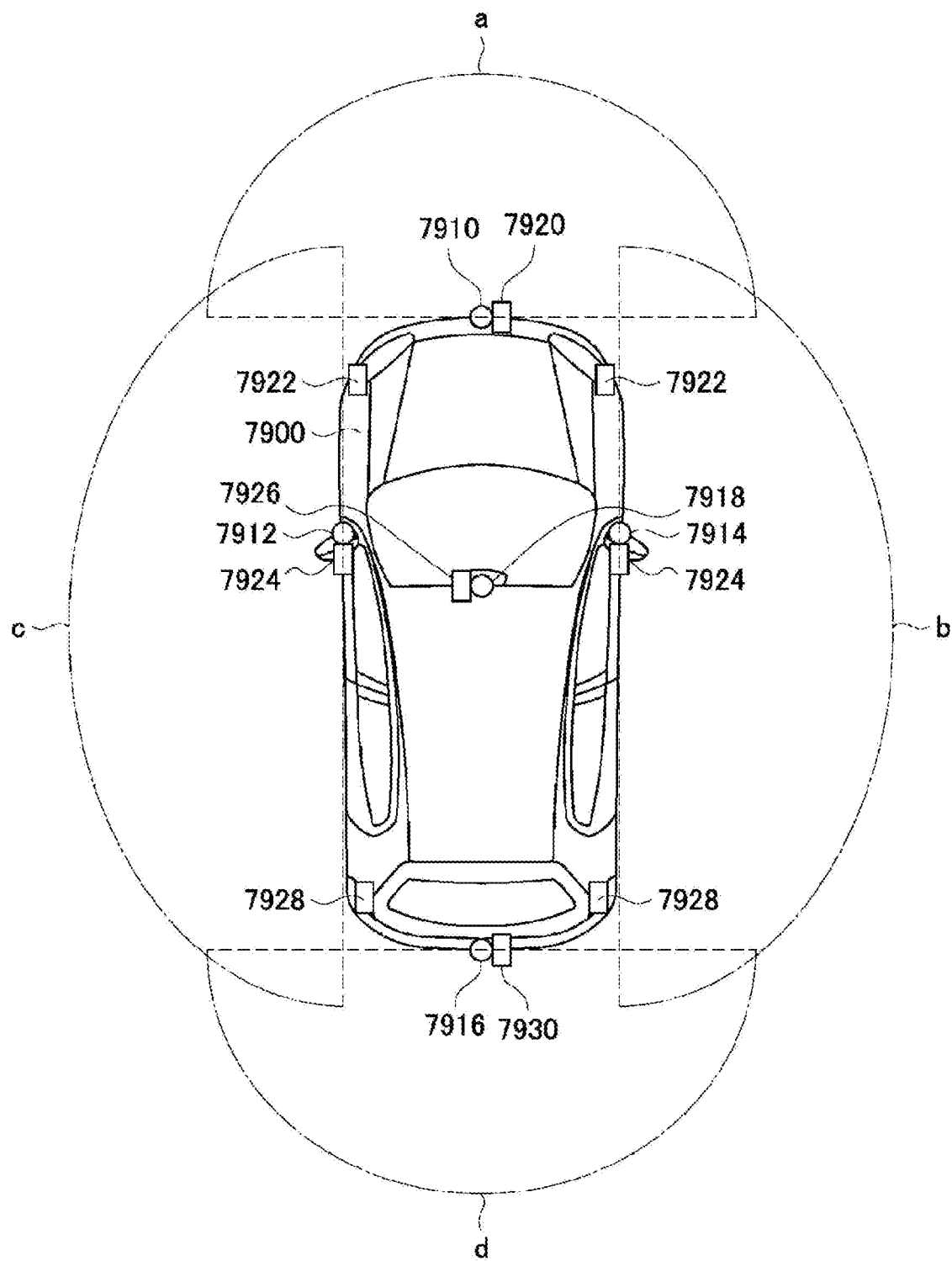
FIG. 27 is an explanatory view illustrating an example of installation positions of an out-vehicle information detector and an image pickup unit.

Here, FIG. 27 illustrates an example of the installation positions of the image pickup unit 7410 and the out-vehicle information detector 7420. Image pickup units 7910, 7912, 7914, 7916, and 7918 are provided, for example, at least one position of a front nose, a side mirror, a rear bumper, a back door, or an upper portion of a windshield in the vehicle compartment, of a vehicle 7900. The image pickup unit 7910 provided at the front nose and the image pickup unit 7918 provided at the upper portion of the windshield in the vehicle compartment mainly acquire an image ahead of the vehicle 7900. The image pickup units 7912 and 7914 provided at the side mirrors mainly acquire lateral images of the vehicle 7900. The image pickup unit 7916 provided at the rear bumper or the back door mainly acquires an image behind the vehicle 7900. The image pickup unit 7918 provided at the upper portion of the windshield in the vehicle compartment is mainly used for detecting a vehicle in front, a pedestrian, an obstacle, a traffic signal, a traffic sign, a lane, or the like.

Note that, in FIG. 27, there are illustrated an example of the respective shooting ranges of the image pickup units 7910, 7912, 7914, and 7916. The capturing range a indicates the capturing range of the image pickup unit 7910 provided at the front nose, the capturing ranges b and c indicate the respective capturing ranges of the image pickup units 7912 and 7914 provided at the side mirrors, and the capturing range d indicates the capturing range of the image pickup unit 7916 provided at the rear bumper or the back door. For example, pieces of image data captured by the image pickup units 7910, 7912, 7914, and 7916 are superposed to obtain an overhead view image of the vehicle 7900 viewed from above.

The out-vehicle information detectors 7920, 7922, 7924, 7926, 7928, and 7930 provided at the front, rear, side, corner, and upper portion of the windshield in the vehicle compartment, of the vehicle 7900 may be ultrasonic sensors or radar devices, for example. The out-vehicle information detectors 7920, 7926, and 7930 provided at the front nose, rear bumper, back door, and upper portion of the windshield in the vehicle compartment, of the vehicle 7900, may be, LIDAR devices, for example. These out-vehicle information detectors 7920 to 7930 are mainly used for detecting a vehicle in front, a pedestrian, an obstacle, or the like.

Returning to FIG. 26, the description will be continued. The out-vehicle information detection unit 7400 causes the image pickup unit 7410 to capture an out-vehicle image and receives the captured image data. Furthermore, the out-vehicle information detection unit 7400 receives detection information from the connected out-vehicle information detector 7420. In a case where the out-vehicle information detector 7420 is an ultrasonic sensor, a radar device, or a LIDAR device, the out-vehicle information detection unit 7400 transmits ultrasonic waves, electromagnetic waves, or the like and receives information regarding received reflected waves. The out-vehicle information detection unit 7400 may perform object detection processing or distance detection processing on a person, an automobile, an obstacle, a sign, a character on a road face, or the like, on the basis of the received information. The out-vehicle information detection unit 7400 may perform environment recognition processing for recognizing rainfall, fog, road face condition, or the like, on the basis of the received information. The out-vehicle information detection unit 7400 may calculate the distance to an out-vehicle object, on the basis of the received information.

Furthermore, the out-vehicle information detection unit 7400 may perform image recognition processing or distance detection processing for recognizing a person, an automobile, an obstacle, a sign, a character on a road face, or the like, on the basis of the received image data. The out-vehicle information detection unit 7400 may perform processing of such as distortion correction or alignment on the received image data, and combine the received image data and image data captured by a different image pickup unit 7410 to generate an overhead view image or a panorama image. The out-vehicle information detection unit 7400 may perform viewpoint conversion processing with the image data captured by the different image pickup unit 7410.

The in-vehicle information detection unit 7500 detects in-vehicle information. A driver-state detection unit 7510 that detects a state of a driver is connected to the in-vehicle information detection unit 7500, for example. The driver-state detection unit 7510 may include a camera for capturing the driver, a biosensor for detecting biological information regarding the driver, a microphone for collecting voice in the vehicle compartment, and the like. The biosensor is provided, for example, at a seating face, a steering wheel, or the like, and detects biometric information regarding an occupant seating on the seat or the driver holding the steering wheel. The in-vehicle information detection unit 7500 may calculate the degree of fatigue or the degree of concentration of the driver on the basis of the detection information input from the driver-state detection unit 7510, and may determine whether or not the driver is dozing off. The in-vehicle information detection unit 7500 may perform noise canceling processing or the like on a voice signal of the collected voice.

The integrated control unit 7600 controls the overall operation in the vehicle control system 7000, in accordance with various programs. An input unit 7800 is connected to the integrated control unit 7600. The input unit 7800 can be provided with a device such as a touch panel, a button, a microphone, a switch, or a lever with which an occupant can perform an input operation. Data obtained by performance of voice recognition on voice input by the microphone may be input in the integrated control unit 7600. The input unit 7800 may be, for example, a remote control device that is to use infrared rays or other radio waves, or an external connection device such as a mobile phone or a personal digital assistant (PDA) in response to an operation of the vehicle control system 7000. The input unit 7800 may be, for example, a camera, and in such a case, an occupant can input information with gesture. Alternatively, data obtained by detection of movement of a wearable device worn by an occupant may be input. Moreover, the input unit 7800 may include, for example, an input control circuit or the like that generates an input signal on the basis of information input by an occupant or the like with the input unit 7800 and outputs the input signal to the integrated control unit 7600. The occupant or the like operates the input unit 7800 to input various pieces of data into the vehicle control system 7000 or instructs the vehicle control system 7000 on a processing operation.

The storage unit 7690 may include a read only memory (ROM) that stores various programs to be executed by a microcomputer, and a random access memory (RAM) that stores various parameters, computed results, sensor values, or the like. Furthermore, the storage unit 7690 may be provided with a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices present in external environment 7750. There may be implemented in the general-purpose communication I/F 7620, a cellular communication protocol such as global system of mobile communications (GSM), WiMAX, long term evolution (LTE), or LTE-Advanced (LTE-A), or a wireless communication protocol such as a wireless local area network (LAN) (also referred to as Wi-Fi (registered trademark)), or Bluetooth (registered trademark). The general-purpose communication I/F 7620 may connect to a device (for example, an application server or a control server) present on an external network (for example, the Internet, a cloud network, or a business operator's specific network) through a base station or an access point. Furthermore, the general-purpose communication I/F 7620 may connect to a terminal present near the vehicle (for example, a terminal of a driver, a pedestrian, or a shop, or a machine type communication terminal (MTC)), with a peer-to-peer (P2P) technology.

The dedicated communication I/F 7630 is a communication I/F supporting a communication protocol formulated for use in a vehicle. For example, there may be implemented in the dedicated communication I/F 7630, a communication protocol such as wireless access in vehicle environment (WAVE), dedicated short range communications (DSRC) each of which is a combination of lower layer IEEE 802.11p and upper layer IEEE 1609, or a standard protocol such as a cellular communication protocol. Typically, the dedicated communication I/F 7630 performs a vehicle-to-x (V2X) communication that is a concept including at least a vehicle-to-vehicle communication, a vehicle-to-infrastructure communication, a vehicle-to-home communication, or a vehicle-to-pedestrian communication.

The positioning unit 7640, for example, receives a global navigation satellite system (GNSS) signal (for example, a global positioning system (GPS) signal from a GPS satellite) from a GNSS satellite to perform positioning, and generates positioning information including the latitude, longitude, and altitude of the vehicle. Note that the positioning unit 7640 may specify the current position by exchanging signals with a wireless access point or may acquire the position information from a terminal such as a mobile phone, a personal handyphone system (PHS), or a smartphone having a positioning function.

The beacon receiving unit 7650, for example, receives radio waves or electromagnetic waves transmitted from a radio station or the like installed on a road, and acquires information regarding, for example, the current position, congestion, road closure, or required time. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 present in the vehicle. The in-vehicle device I/F 7660 may establish a wireless connection by using a wireless communication protocol such as wireless LAN, Bluetooth (registered trademark), near field communication (NFC), or wireless universal serial bus (WUSB). Furthermore, the in-vehicle device I/F 7660 may establish a wired communication such as universal serial bus (USB), high-definition multimedia interface (HDMI), or mobile high-definition link (MHL) through a connection terminal that is not illustrated (and a cable if necessary). The in-vehicle device 7760 may include, for example, at least one of a mobile device or a wearable device possessed by an occupant, or an information device carried in or attached to the vehicle. Furthermore, the in-vehicle device 7760 may include a navigation device that performs a route search to any destination. The in-vehicle device I/F 7660 exchanges control signals or data signals with these in-vehicle device 7760.

The on-board network I/F 7680 is an interface that mediates communication between the microcomputer 7610 and the communication network 7010. The on-board network I/F 7680 exchanges signals and the like in accordance with a predetermined protocol supported by the communication network 7010.

The microcomputer 7610 of the integrated control unit 7600 controls the vehicle control system 7000 in accordance with various programs, on the basis of information acquired through at least one of the general-purpose communication I/F 7620, the dedicated communication I/F 7630, the positioning unit 7640, the beacon receiving unit 7650, the in-vehicle device I/F 7660, or the on-board network I/F 7680. For example, the microcomputer 7610 may compute a control target value of the driving force generating device, the steering mechanism, or the braking device, on the basis of acquired in-vehicle and out-vehicle information, and may output a control command to the drive system control unit 7100. For example, the microcomputer 7610 may perform coordinated control for the purpose of providing the function of advanced driver assistance system (ADAS) including collision avoidance or impact mitigation of the vehicle, follow-up traveling based on inter-vehicle distance, vehicle-speed maintained traveling, vehicle collision warning, lane departure warning to the vehicle, or the like. Furthermore, the microcomputer 7610 controls the driving force generating device, the steering mechanism, the braking device, or the like on the basis of acquired vehicle peripheral information, so that coordinated control may be performed for the purpose of, for example, automatic driving that autonomously travels without depending on the operation of the driver.

The microcomputer 7610 may generate three-dimensional distance information between the vehicle and an object such as a surrounding structure and a person on the basis of information acquired through at least one of the general-purpose communication I/F 7620, the dedicated communication I/F 7630, the positioning unit 7640, the beacon receiving unit 7650, the in-vehicle device I/F 7660, or the on-board network I/F 7680, and may create local map information including peripheral information at the current position of the vehicle. Furthermore, the microcomputer 7610 may predict danger such as collision of a vehicle, approach of a pedestrian or the like, or entry into a road where road is closed, on the basis of acquired information, and may generate a warning signal. The warning signal may be, for example, a signal for generating an alarm sound or for turning on a warning lamp.

The voice and image output unit 7670 transmits an output signal of at least one of voice or an image to an output device capable of visually or audibly notifying the occupant of the vehicle or the outside of the vehicle. In the example of FIG. 26, as an output device, an audio speaker 7710, a display unit 7720, and an instrument panel 7730 are exemplified. The display unit 7720 may include at least one of an on-board display or a head-up display, for example. The display unit 7720 may have an augmented reality (AR) display function. The output device may be a wearable device other than these devices, such as a headphone, a spectacular display to be worn by an occupant, a projector, a lamp, or the like. In a case where the output device is a display device, the display device visually displays results obtained by the various types of processing executed by the microcomputer 7610 or information received from the other control unit, in various formats such as text, image, table, or graph. Furthermore, in a case where the output device is a voice output device, the voice output device converts an audio signal including reproduced voice data, acoustic data, or the like into an analog signal to audibly output the resulting signal.

Note that, in the example illustrated in FIG. 26, at least two control units connected through the communication network 7010 may be integrally formed as one control unit. Alternatively, the individual control units may include a plurality of control units. Moreover, the vehicle control system 7000 may include another control unit that is not illustrated. Furthermore, in the above description, some or all of the functions performed by any one of the control units may be provided by the other control unit. That is, as long as information is transmitted and received through the communication network 7010, predetermined computing processing may be performed by any of the control units. Similarly, the sensor or the device connected to any of the control units may be connected to the other control unit, and the plurality of control units may mutually transmit and receive detection information through the communication network 7010.

For such a vehicle control system, in a case where the image processing apparatus according to the present technology is applied to, for example, the out-vehicle information detector, polarization information and normal information can be accurately acquired in the out-vehicle information detector. Furthermore, a non-polarized image can be acquired. Therefore, use of the polarization information, the normal information, and the non-polarized image acquired by the out-vehicle information detector enables obstacle detection or the like, with high accuracy, so that a vehicle control system enabling safer traveling can be constructed.

Furthermore, the above-described image processing apparatus may be an image pickup device, an electronic device including an image pickup function, or the like. Moreover, the series of processing described in the specification can be executed by hardware, software, or a combination thereof. For execution of the processing by software, a program recorded the processing sequence is installed in a memory in a computer incorporated in dedicated hardware to cause the software to execute the processing. Alternatively, the program can be installed in a general-purpose computer executable of various types of processing to cause the computer to execute the processing.

For example, the program can be recorded in advance in a hard disk, a solid state drive (SSD), or a read only memory (ROM), as a storage medium. Alternatively, the program can be temporarily or permanently stored (recorded) in a removable storage medium such as a flexible disk, a compact disc read only memory (CD-ROM), a magneto optical (MO) disk, a digital versatile disc (DVD), a blu-ray disc (BD (registered trademark)), a magnet disk, or a semiconductor memory card. Such a removable storage medium can be provided as so-called package software.

Furthermore, in addition to installing of the program from a removable storage medium into the computer, the program may be transferred by wireless or by wire from a download site to the computer through a network such as local area network (LAN) or the Internet. In the computer, the program transferred in this manner can be received and installed in a built-in recording medium such as a hard disk.

Note that the effects described in the present specification are merely exemplified and are not intended to be limiting, and there may be additional effects that are not described. Furthermore, the present technology should not be construed as being limited to the embodiments of the above-described technology. The embodiments of this technology disclose the present technology in the form of exemplification, and it is obvious that modifications and substitutions of the embodiments can be made by those skilled in the art without departing from the gist of the present technology. In other words, in order to judge the gist of the present technology, the scope of claims should be taken into consideration.

Furthermore, the image processing apparatus of the present technology can also have the following configuration.

(1) An image processing apparatus including:
 a demosaicing unit configured to generate a non-polarized image, and a polarization component image per polarization direction, from an captured image including non-polarizing pixels and polarizing pixels per at least two polarization directions; and
 a polarization information generating unit configured to generate polarization information indicating a polarization characteristic of a subject included in the captured image, from the non-polarized image and the polarization component image generated by the demosaicing unit.

(2) The image processing apparatus according to (1), in which the demosaicing unit calculates, with a target pixel, a polarizing pixel at a pixel position where the polarizing pixel is identical in polarization direction to the target pixel, in peripheral pixels of the target pixel, and non-polarizing pixels equal in a pixel position to the polarizing pixel and at a pixel position of the target pixel, a pixel value of a polarizing pixel at the pixel position of the target pixel, for each of the polarization directions.

(3) The image processing apparatus according to (2), in which the demosaicing unit calculates, with a relationship between a pixel average value of non-polarizing pixels at pixel positions in the identical polarization direction and a pixel value of the non-polarizing pixel at the pixel position of the target pixel, the pixel value of the polarizing pixel at the pixel position of the target pixel relative to a pixel average value of polarizing pixels at pixel positions in the identical polarization direction.

(4) The image processing apparatus according to any of (1) to (3), further including: a pixel processing unit configured to generate, with a non-polarizing pixel, a pixel at a pixel position of a polarizing pixel, the pixel processing unit being configured to generate a non-polarized image; and
 a noise removal unit configured to calculate a weight to be used for smoothing filter processing, on the basis of a non-polarizing pixel at a pixel position of a target pixel and a non-polarizing pixel at a pixel position of a peripheral pixel identical in polarization direction to the target pixel, the noise removal unit being configured to calculate, with the calculated weight, the target pixel, and a polarizing pixel at the pixel position of the peripheral pixel identical in polarization direction to the target pixel, a pixel value of a polarizing pixel at the pixel position of the target pixel, in which the demosaicing unit generates a polarization component image, with the polarizing pixel after noise removal by the noise removal unit.

(5) The image processing apparatus according to any of (1) to (4), in which the polarization information generating unit calculates a polarization parameter of a polarization model expression indicating the polarization characteristic at a target pixel position, on the basis of the polarization directions, a non-polarizing pixel at the target pixel position, and a polarizing pixel for each of the polarization directions.

(6) The image processing apparatus according to (5), in which the polarization information generating unit uses a pixel value of the non-polarizing pixel equal in sensitivity to the polarizing pixel, as the polarization parameter.

(7) The image processing apparatus according to any of (1) to (6), further including: a normal information generating unit configured to generate normal information regarding the subject on the basis of the polarization information generated by the polarization information generating unit.

Furthermore, the image pickup device of the present technology can also have the following configuration.

(1) An image pickup device in which non-polarizing pixels and polarizing pixels are disposed,
the polarizing pixels being provided per at least two polarization directions.

(2) The image pickup device according to (1), further including: a pixel control unit configured to control to make the non-polarizing pixels identical in sensitivity to the polarizing pixels.

(3) The image pickup device according to (2), in which the pixel control unit controls an exposure period of time of the non-polarizing pixels or the polarizing pixels to make the non-polarizing pixels identical in sensitivity to the polarizing pixels.

(4) The image pickup device according to any (1) to (3), in which the at least two polarization directions are symmetrical in angle with respect to sides of the pixels each having a rectangular shape.

(5) The image pickup device according to any (1) to (4), in which in a 2×2 pixel region, the non-polarizing pixels each are provided at a diagonal pixel position and remaining pixels are the polarizing pixels.

(6) The image pickup device according to any (1) to (5), in which the polarizing pixels for each of the polarization directions are identical in color, and the non-polarizing pixels are pixels per predetermined color component.

(7) The image pickup device according to any (1) to (6), further including: a pixel processing unit configured to perform interpolation processing with non-polarizing pixels, or unification processing on neighboring polarizing pixels identical in polarization direction and unification processing on neighboring non-polarizing pixels, the pixel processing unit being configured to generate a non-polarized image, or a non-polarized image and a polarized image.

(8) The image pickup device according to (7), in which the pixel processing unit performs unification processing on pixels identical in color.

INDUSTRIAL APPLICABILITY

In the image processing apparatus, the image processing method, and the image pickup device of this technology, the non-polarized image and the polarization component image per polarization direction are generated by the demosaicing unit, from the captured image including the non-polarizing pixels and the polarizing pixels per at least two polarization directions, the polarization information indicating the polarization characteristics of the subject included in the captured image is generated from the non-polarized image and the polarization component image. Therefore, the polarization information is generated with not only the polarization component image but also the non-polarized image not having a decrease in the amount of light. Therefore, accurate polarization information can be acquired compared to a case where polarization information is generated on the basis of the polarization component image. Therefore, it is suitable for devices capable of performing control and the like, with polarization information, for example, a vehicle control system and the like.

REFERENCE SIGNS LIST

10 Image processing apparatus
20, 20-1, 20-2 Image pickup unit
21, 21-1, 21-2 Image sensor
22, 22-1, 22-3 Polarizing filter
23 Color mosaic filter
30 Pixel processing unit
31 Non-polarizing-pixel interpolation unit
32 Pixel-value computing unit
40 Noise removal unit
41 Weight calculation unit
42, 44 Multiplication unit
43, 45 Integration unit
50 Demosaicing unit
51 Bayer corresponding processing unit
52 Polarizing-pixel averaging processing unit
53 Non-polarizing-pixel averaging processing unit
54 Central pixel acquisition unit
55 Correlation processing unit
60 Polarization information generating unit
70 Normal information generating unit
211 Pixel array unit
212, 212-2 Vertical scanning circuit
213 Horizontal scanning circuit

The invention claimed is:

1. An image processing apparatus comprising:
a demosaicing unit configured to generate a non-polarized image, and a polarization component image per polarization direction, from a captured image including non-polarizing pixels and polarizing pixels per at least two polarization directions; and
a polarization information generating unit configured to generate polarization information indicating a polarization characteristic of a subject included in the captured image, from the non-polarized image and the polarization component image generated by the demosaicing unit,
wherein the polarization information generating unit calculates a polarization parameter of a polarization model expression indicating the polarization characteristic at a target pixel position, on a basis of the polarization directions, a non-polarizing pixel at the target pixel position, and a polarizing pixel for each of the polarization directions, and
wherein the demosaicing unit and the polarization information generating unit are each implemented via at least one processor.

2. The image processing apparatus according to claim 1, wherein the demosaicing unit calculates, for each of the polarization directions and using a target pixel, a polarizing pixel at a pixel position where the polarizing pixel is identical in polarization direction to the target pixel in peripheral pixels of the target pixel, and non-polarizing pixels equal in a pixel position to the polarizing pixel and at a pixel position of the target pixel, a pixel value of a polarizing pixel at the pixel position of the target pixel.

3. The image processing apparatus according to claim 2, wherein the demosaicing unit calculates, with a relationship between a pixel average value of non-polarizing pixels at pixel positions in the identical polarization direction and a pixel value of the non-polarizing pixel at the pixel position of the target pixel, the pixel value of the polarizing pixel at the pixel position of the target pixel relative to a pixel average value of polarizing pixels at pixel positions in the identical polarization direction.

4. The image processing apparatus according to claim 1, further comprising:
a pixel processing unit configured to generate, with a non-polarizing pixel, a pixel at a pixel position of a polarizing pixel, to generate a non-polarized image; and
a noise removal unit configured to calculate a weight to be used for smoothing filter processing, on a basis of a non-polarizing pixel at a pixel position of a target pixel and also on a basis of a non-polarizing pixel at a pixel position of a peripheral pixel that is identical in polarization direction to the target pixel, and to further calculate, using the calculated weight, the target pixel, and a polarizing pixel at the pixel position of the peripheral pixel that is identical in polarization direction to the target pixel, a pixel value of a polarizing pixel at the pixel position of the target pixel,
wherein the demosaicing unit generates a polarization component image, with the polarizing pixel after noise removal by the noise removal unit, and
wherein the pixel processing unit and the noise removal unit are each implemented via at least one processor.

5. The image processing apparatus according to claim 1, wherein the polarization information generating unit uses a pixel value of the non-polarizing pixel equal in sensitivity to the polarizing pixel, as the polarization parameter.

6. The image processing apparatus according to claim 1, further comprising:
a normal information generating unit configured to generate normal information regarding the subject on a basis of the polarization information generated by the polarization information generating unit,
wherein the normal information generating unit is implemented via at least one processor.

7. An image processing method comprising:
generating a non-polarized image, and a polarization component image per polarization direction, from a captured image including non-polarizing pixels and polarizing pixels per at least two polarization directions;
generating polarization information indicating a polarization characteristic of a subject included in the captured image, from the non-polarized image and the generated polarization component image; and
calculating a polarization parameter of a polarization model expression indicating the polarization characteristic at a target pixel position, on a basis of the polarization directions, a non-polarizing pixel at the target pixel position, and a polarizing pixel for each of the polarization directions.

8. The image processing method according to claim 7, further comprising:
calculating, for each of the polarization directions and using a target pixel, a polarizing pixel at a pixel position where the polarizing pixel is identical in polarization direction to the target pixel in peripheral pixels of the target pixel and non-polarizing pixels equal in a pixel position to the polarizing pixel and at a pixel position of the target pixel, a pixel value of a polarizing pixel at the pixel position of the target pixel.

9. The image processing method according to claim 8, further comprising:
calculating, with a relationship between a pixel average value of non-polarizing pixels at pixel positions in the identical polarization direction and a pixel value of the non-polarizing pixel at the pixel position of the target pixel, the pixel value of the polarizing pixel at the pixel position of the target pixel relative to a pixel average value of polarizing pixels at pixel positions in the identical polarization direction.

10. The image processing method according to claim 7, further comprising:
generating, with a non-polarizing pixel, a pixel at a pixel position of a polarizing pixel, to generate a non-polarized image;
calculating a weight to be used for smoothing filter processing, on a basis of a non-polarizing pixel at a pixel position of a target pixel and also on a basis of a non-polarizing pixel at a pixel position of a peripheral pixel that is identical in polarization direction to the target pixel;
calculating, using the calculated weight, the target pixel, and a polarizing pixel at the pixel position of the peripheral pixel that is identical in polarization direction to the target pixel, a pixel value of a polarizing pixel at the pixel position of the target pixel; and
generating a polarization component image, with the polarizing pixel after noise removal.

11. The image processing method according to claim 7, wherein a pixel value of the non-polarizing pixel equal in sensitivity to the polarizing pixel is used as the polarization parameter.

12. The image processing method according to claim 7, further comprising:
generating normal information regarding the subject on a basis of the generated polarization information.

* * * * *